United States Patent
Souder et al.

(10) Patent No.: US 10,956,854 B2
(45) Date of Patent: Mar. 23, 2021

(54) SYSTEMS AND METHODS FOR TRACKING GOODS CARRIERS

(71) Applicant: BXB Digital Pty Limited, Sydney (AU)

(72) Inventors: Michael Souder, Fremont, CA (US); Dan Bricarello, South San Francisco, CA (US); Juan Castillo, San Francisco, CA (US); Prasad Srinivasamurthy, Saratoga, CA (US)

(73) Assignee: BXB DIGITAL PTY LIMITED, Sydney (AU)

( * ) Notice: Subject to any disclaimer, the term of this patent is extended or adjusted under 35 U.S.C. 154(b) by 233 days.

(21) Appl. No.: 16/059,455

(22) Filed: Aug. 9, 2018

(65) Prior Publication Data

US 2019/0122173 A1 Apr. 25, 2019

Related U.S. Application Data

(60) Provisional application No. 62/575,262, filed on Oct. 20, 2017.

(51) Int. Cl.
*G06Q 10/08* (2012.01)
*G06K 9/00* (2006.01)
(Continued)

(52) U.S. Cl.
CPC ..... *G06Q 10/0833* (2013.01); *G06K 9/00771* (2013.01); *G06T 7/0008* (2013.01);
(Continued)

(58) Field of Classification Search
CPC ... G06Q 10/0833; G06T 7/292; G06T 7/0008; G06T 2207/30108; G06K 9/00771; G06K 9/6274; G06N 3/084
See application file for complete search history.

(56) References Cited

U.S. PATENT DOCUMENTS

| 681,428 | A | 8/1901 | Ambrose |
| 5,438,607 | A | 8/1995 | Przygoda, Jr. et al. |

(Continued)

FOREIGN PATENT DOCUMENTS

| CA | 2185354 | 9/1995 |
| DE | 9306107 | 8/1994 |

(Continued)

OTHER PUBLICATIONS

Business Wire, "ImageID's Visidot AIDC Technology is an "Alternative to RFID" for Rapid, Multiple-Asset ID and Tracking of Shipping Cases and Pallets," 1, New York, Sep. 13, 2005.*
(Continued)

*Primary Examiner* — Nathan Erb
(74) *Attorney, Agent, or Firm* — Kilpatrick Townsend & Stockton LLP

(57) ABSTRACT

Provided are methods, devices, and computer-program products for tracking goods carriers from a particular source. According to some embodiments of the invention, a computer-implemented method includes training an artificial neural network to count the number of goods carriers from a particular source within an image. Further, the method includes receiving a first image file generated by a first imaging device; using the trained artificial neural network to determine a first number of goods carriers from the particular source in the first image; receiving a second image file generated by a second imaging device; using the trained artificial neural network to determine a second number of goods carriers from the particular source in the second image; and determining whether the first number of goods carriers from the particular source in the first image is equal to the second number of goods carriers from the particular source in the second image.

30 Claims, 10 Drawing Sheets

(51) Int. Cl.
*G06T 7/292* (2017.01)
*G06T 7/00* (2017.01)
*G06K 9/62* (2006.01)
*G06N 3/08* (2006.01)

(52) U.S. Cl.
CPC ............ *G06T 7/292* (2017.01); *G06K 9/6274* (2013.01); *G06N 3/084* (2013.01); *G06T 2207/30108* (2013.01)

(56) References Cited

U.S. PATENT DOCUMENTS

| | | | |
|---|---|---|---|
| 5,491,486 A | 2/1996 | Welles, II et al. | |
| 5,691,980 A | 11/1997 | Welles, II et al. | |
| 5,774,876 A | 6/1998 | Woolley et al. | |
| 5,844,482 A | 12/1998 | Guthrie et al. | |
| 6,199,488 B1 | 3/2001 | Favaron et al. | |
| 6,294,114 B1 | 9/2001 | Muirhead | |
| 6,373,389 B1 | 4/2002 | Przygoda, Jr. et al. | |
| 6,415,223 B1 | 7/2002 | Lin et al. | |
| 6,483,434 B1 | 11/2002 | Umiker | |
| 6,600,418 B2 | 7/2003 | Francis et al. | |
| 6,661,339 B2 | 12/2003 | Muirhead | |
| 6,669,089 B2 | 12/2003 | Cybulski et al. | |
| 6,700,533 B1 | 3/2004 | Werb et al. | |
| 6,707,381 B1* | 3/2004 | Maloney ............ G07G 1/0054 340/568.1 | |
| 6,717,517 B2 | 4/2004 | Przygoda, Jr. | |
| 6,718,888 B2 | 4/2004 | Muirhead | |
| 6,749,418 B2 | 6/2004 | Muirhead | |
| 6,814,287 B1 | 11/2004 | Chang et al. | |
| 6,900,815 B2* | 5/2005 | Yoshioka ................ G09G 5/06 345/542 | |
| 6,934,625 B2 | 8/2005 | Haddad | |
| 6,943,678 B2 | 9/2005 | Muirhead | |
| 7,026,937 B2 | 4/2006 | Przygoda, Jr. | |
| 7,034,683 B2 | 4/2006 | Ghazarian | |
| 7,100,052 B2 | 8/2006 | Ghazarian | |
| 7,133,704 B2 | 11/2006 | Twitchell, Jr. | |
| 7,155,264 B2 | 12/2006 | Twitchell, Jr. | |
| 7,173,529 B2 | 2/2007 | Przygoda, Jr. | |
| 7,209,771 B2 | 4/2007 | Twitchell, Jr. | |
| 7,242,306 B2 | 7/2007 | Wildman et al. | |
| 7,252,230 B1 | 8/2007 | Sheikh et al. | |
| 7,313,476 B2 | 12/2007 | Nichols et al. | |
| 7,336,152 B2 | 2/2008 | Horwitz et al. | |
| 7,336,167 B2 | 2/2008 | Olsen, III et al. | |
| 7,336,182 B1 | 2/2008 | Baranowski et al. | |
| 7,342,496 B2 | 3/2008 | Muirhead | |
| 7,365,737 B2 | 4/2008 | Marvit et al. | |
| 7,388,492 B2 | 6/2008 | Watanabe | |
| 7,398,153 B2 | 7/2008 | Workman et al. | |
| 7,400,259 B2 | 7/2008 | O'Connor et al. | |
| 7,443,297 B1 | 10/2008 | Baranowksi et al. | |
| 7,446,658 B2 | 11/2008 | Panotopoulus | |
| 7,564,357 B2 | 7/2009 | Baranowski et al. | |
| 7,633,389 B2 | 12/2009 | Montovani et al. | |
| 7,656,278 B2 | 2/2010 | Onishi et al. | |
| 7,668,596 B2 | 2/2010 | Von Arx et al. | |
| 7,735,430 B2 | 6/2010 | Muirhead | |
| 7,742,745 B2 | 6/2010 | Twitchell, Jr. | |
| 7,752,980 B2 | 7/2010 | Muirhead | |
| 7,783,423 B2 | 8/2010 | Verma et al. | |
| 7,789,024 B2 | 9/2010 | Muirhead | |
| 7,804,400 B2 | 9/2010 | Muirhead | |
| 7,874,256 B2 | 1/2011 | Muirhead | |
| 7,903,084 B2 | 3/2011 | Marvit et al. | |
| 7,948,371 B2 | 5/2011 | Muirhead | |
| 7,956,746 B2 | 6/2011 | Truscott et al. | |
| 7,963,235 B2 | 6/2011 | Muirhead | |
| 7,999,670 B2 | 8/2011 | McClellan et al. | |
| 8,036,826 B2 | 10/2011 | MacIntosh et al. | |
| 8,041,079 B2* | 10/2011 | Chiu ........................ G06T 7/97 382/103 | |
| 8,077,040 B2 | 12/2011 | Muirhead | |
| 8,095,070 B2 | 1/2012 | Twitchell, Jr. | |
| RE43,178 E | 2/2012 | Ghazarian | |
| 8,111,157 B2 | 2/2012 | Diener et al. | |
| 8,159,338 B2 | 4/2012 | Breed | |
| 8,184,852 B2* | 5/2012 | Hofman ............ G06K 9/00973 382/100 | |
| 8,204,439 B2 | 6/2012 | Twitchell, Jr. | |
| 8,210,107 B2 | 7/2012 | Muirhead | |
| 8,219,558 B1 | 7/2012 | Trandal et al. | |
| 8,248,242 B2 | 8/2012 | Caliri et al. | |
| 8,269,605 B2 | 9/2012 | Moore | |
| 8,313,594 B2 | 11/2012 | Muirhead | |
| 8,331,862 B2 | 12/2012 | Twitchell, Jr. | |
| 8,347,794 B2 | 1/2013 | Muirhead | |
| 8,511,555 B2 | 8/2013 | Babcock et al. | |
| 8,514,058 B2 | 8/2013 | Cameron | |
| 8,585,850 B2 | 11/2013 | Muirhead | |
| 8,594,923 B2 | 11/2013 | Wong et al. | |
| 8,630,768 B2 | 1/2014 | McClellan et al. | |
| 8,692,764 B2 | 4/2014 | Marvit et al. | |
| 8,694,251 B2 | 4/2014 | Janardhanan et al. | |
| 8,718,372 B2* | 5/2014 | Holeva ................ B66F 9/122 382/181 | |
| 8,830,072 B2 | 9/2014 | Batra et al. | |
| 8,849,007 B2* | 9/2014 | Holeva ................ B66F 9/122 382/141 | |
| 8,977,032 B2* | 3/2015 | Holeva ................ B66F 9/122 382/141 | |
| 9,025,827 B2* | 5/2015 | Holeva ................ B66F 9/122 382/104 | |
| 9,025,886 B2* | 5/2015 | Holeva ................ B66F 9/122 382/202 | |
| 9,082,195 B2* | 7/2015 | Holeva ................ B66F 9/122 | |
| 9,087,384 B2* | 7/2015 | Holeva ................ B66F 9/122 | |
| 9,230,227 B2 | 1/2016 | Muirhead | |
| 9,466,198 B2 | 10/2016 | Burch et al. | |
| 9,488,986 B1* | 11/2016 | Solanki ............ G06K 9/00791 | |
| 9,504,414 B2 | 11/2016 | Coza et al. | |
| 9,613,239 B2 | 4/2017 | Lee et al. | |
| 9,635,346 B2 | 4/2017 | Iida | |
| 9,656,485 B2* | 5/2017 | Asai ........................ B41J 2/4753 | |
| 9,679,237 B2 | 6/2017 | Linkesch et al. | |
| 9,813,850 B2 | 11/2017 | Lee et al. | |
| 9,868,212 B1 | 1/2018 | Hinterstoisser | |
| 9,947,196 B2 | 4/2018 | Lee et al. | |
| 9,965,662 B2 | 5/2018 | Lee et al. | |
| 10,102,629 B1 | 10/2018 | Li | |
| 10,242,273 B1 | 3/2019 | Eckman | |
| 10,328,578 B2 | 6/2019 | Holz | |
| 10,339,619 B2 | 7/2019 | Muirhead | |
| 10,346,797 B2 | 7/2019 | Jacobus et al. | |
| 10,347,005 B2 | 7/2019 | Iida et al. | |
| 10,368,222 B2 | 7/2019 | Carlson et al. | |
| 10,491,375 B2 | 11/2019 | Maggu et al. | |
| 10,549,885 B2 | 2/2020 | de Bokx et al. | |
| 10,614,319 B2 | 4/2020 | Douglas et al. | |
| 1,081,663 A1 | 10/2020 | Conners et al. | |
| 2002/0047850 A1* | 4/2002 | Yoshioka ................ G09G 5/06 345/600 | |
| 2002/0070862 A1 | 6/2002 | Francis et al. | |
| 2003/0083964 A1 | 5/2003 | Horwitz et al. | |
| 2003/0089771 A1 | 5/2003 | Cybulski et al. | |
| 2003/0137968 A1 | 7/2003 | Lareau et al. | |
| 2003/0170357 A1 | 9/2003 | Garwood | |
| 2004/0015264 A1* | 1/2004 | Holland ................ B66C 13/46 700/225 | |
| 2004/0103031 A1 | 5/2004 | Weinschenk | |
| 2004/0113786 A1* | 6/2004 | Maloney ............ G07G 1/0054 340/568.1 | |
| 2004/0233041 A1 | 11/2004 | Bohman et al. | |
| 2005/0046567 A1 | 3/2005 | Mortenson et al. | |
| 2005/0063590 A1 | 3/2005 | Simon et al. | |
| 2005/0226489 A1 | 10/2005 | Beach et al. | |
| 2005/0231366 A1 | 10/2005 | McHugh et al. | |
| 2006/0232412 A1 | 10/2006 | Tabacman et al. | |
| 2006/0254474 A1 | 11/2006 | Roth et al. | |
| 2006/0261959 A1 | 11/2006 | Worthy et al. | |
| 2007/0091292 A1 | 4/2007 | Cho et al. | |

(56) References Cited

U.S. PATENT DOCUMENTS

| | | |
|---|---|---|
| 2007/0095905 A1 | 5/2007 | Kadaba |
| 2007/0108296 A1 | 5/2007 | Konopka et al. |
| 2007/0282482 A1 | 12/2007 | Beucher et al. |
| 2008/0106468 A1 | 5/2008 | Litva et al. |
| 2008/0114487 A1 | 5/2008 | Schuler et al. |
| 2008/0143484 A1 | 6/2008 | Twitchell |
| 2010/0006377 A1* | 1/2010 | McCabe ............... B66F 9/0755 187/224 |
| 2010/0299278 A1 | 11/2010 | Kriss et al. |
| 2010/0310182 A1 | 12/2010 | Kroepfl et al. |
| 2010/0332407 A1 | 12/2010 | Grieve et al. |
| 2011/0040440 A1 | 2/2011 | de Oliveira et al. |
| 2011/0095871 A1 | 4/2011 | Kail et al. |
| 2011/0169636 A1 | 7/2011 | Kadaba |
| 2011/0227725 A1 | 9/2011 | Muirhead |
| 2011/0251920 A1 | 10/2011 | Watson |
| 2011/0266338 A1 | 11/2011 | Babcock et al. |
| 2012/0066511 A1 | 3/2012 | Scheidt et al. |
| 2012/0105202 A1 | 5/2012 | Gits et al. |
| 2012/0126000 A1 | 5/2012 | Kunzig et al. |
| 2012/0232430 A1 | 9/2012 | Boissy et al. |
| 2012/0239499 A1 | 9/2012 | Zughaib et al. |
| 2012/0252501 A1 | 10/2012 | Smith et al. |
| 2012/0323431 A1 | 12/2012 | Wong et al. |
| 2013/0041290 A1 | 2/2013 | Kording et al. |
| 2013/0041617 A1 | 2/2013 | Pease et al. |
| 2013/0045760 A1 | 2/2013 | Obermeyer et al. |
| 2013/0101230 A1* | 4/2013 | Holeva ................... B66F 9/122 382/202 |
| 2013/0324151 A1 | 12/2013 | Lee et al. |
| 2014/0016821 A1 | 1/2014 | Arth et al. |
| 2014/0049392 A1 | 2/2014 | Wagner |
| 2014/0062774 A1 | 3/2014 | Hale et al. |
| 2014/0120945 A1 | 5/2014 | Sharma et al. |
| 2014/0193077 A1* | 7/2014 | Shiiyama ............. G06F 16/583 382/190 |
| 2014/0222711 A1 | 8/2014 | Tibbs et al. |
| 2014/0289020 A1 | 9/2014 | Schullian et al. |
| 2014/0297485 A1 | 10/2014 | Steely et al. |
| 2015/0039529 A1 | 2/2015 | Barakat |
| 2015/0062160 A1* | 3/2015 | Sakamoto ........... G06F 3/04815 345/633 |
| 2015/0120597 A1 | 4/2015 | Dertadian |
| 2015/0127496 A1 | 5/2015 | Marathe et al. |
| 2015/0146989 A1* | 5/2015 | Shiiyama ............. G06K 9/4676 382/197 |
| 2015/0379510 A1 | 12/2015 | Smith |
| 2016/0021636 A1 | 1/2016 | Krallman et al. |
| 2016/0063550 A1 | 3/2016 | Caldwell |
| 2016/0189000 A1 | 6/2016 | Dube et al. |
| 2016/0198341 A1 | 7/2016 | Fransen |
| 2016/0198431 A1 | 7/2016 | Pattabiraman et al. |
| 2016/0205500 A1 | 7/2016 | Lee et al. |
| 2016/0205654 A1 | 7/2016 | Robinson |
| 2016/0239706 A1* | 8/2016 | Dijkman ................... G06K 9/66 |
| 2016/0260059 A1 | 9/2016 | Benjamin et al. |
| 2016/0260301 A1 | 9/2016 | Miller et al. |
| 2016/0321729 A1* | 11/2016 | Westphal ............. G06Q 10/087 |
| 2017/0015111 A1* | 1/2017 | Asai ..................... B41J 2/4753 |
| 2017/0019264 A1 | 1/2017 | Nugent et al. |
| 2017/0140408 A1 | 5/2017 | Wuehler |
| 2017/0243103 A1 | 8/2017 | Linkesch et al. |
| 2017/0323412 A1 | 11/2017 | Muirhead |
| 2017/0366357 A1 | 12/2017 | Pattanaik et al. |
| 2017/0372103 A1 | 12/2017 | Lee et al. |
| 2018/0009234 A1* | 1/2018 | Ohi ...................... B41J 2/4753 |
| 2018/0038805 A1* | 2/2018 | Heikkila .................... G06T 7/74 |
| 2018/0039524 A1* | 2/2018 | Dettori .................... G06F 9/505 |
| 2018/0082390 A1 | 3/2018 | Leidner et al. |
| 2018/0089638 A1 | 3/2018 | Christidis et al. |
| 2018/0143995 A1 | 5/2018 | Bailey et al. |
| 2018/0196680 A1* | 7/2018 | Wang ...................... G06F 8/63 |
| 2018/0232693 A1 | 8/2018 | Gillen et al. |
| 2018/0268348 A1* | 9/2018 | Guan ................... G06Q 10/08 |
| 2018/0293645 A1 | 10/2018 | Pannicke et al. |
| 2018/0304468 A1 | 10/2018 | Holz |
| 2018/0322453 A1 | 11/2018 | Lantz et al. |
| 2018/0342032 A1 | 11/2018 | Daigle et al. |
| 2019/0012637 A1 | 1/2019 | Gillen |
| 2019/0019144 A1 | 1/2019 | Gillen |
| 2019/0057231 A1 | 2/2019 | Bandil et al. |
| 2019/0080392 A1 | 3/2019 | Youb et al. |
| 2019/0098432 A1 | 3/2019 | Carlson et al. |
| 2019/0109702 A1 | 4/2019 | Maggu et al. |
| 2019/0130345 A1 | 5/2019 | Antor et al. |
| 2019/0190719 A1 | 6/2019 | van de Ruit et al. |
| 2019/0251385 A1* | 8/2019 | Kotula ............... G06K 7/10722 |
| 2019/0259062 A1 | 8/2019 | Caldwell |
| 2019/0340623 A1 | 11/2019 | Rivkind et al. |
| 2019/0370816 A1 | 12/2019 | Hu |
| 2020/0019927 A1 | 1/2020 | Muirhead |
| 2020/0118117 A1 | 4/2020 | McManus et al. |
| 2020/0209343 A1 | 7/2020 | Connors et al. |
| 2020/0272986 A1 | 8/2020 | Bandil et al. |

FOREIGN PATENT DOCUMENTS

| | | |
|---|---|---|
| DE | 102006009802 | 4/2007 |
| DE | 202012008230 | 10/2012 |
| EP | 1246094 | 10/2002 |
| EP | 3128471 | 2/2017 |
| EP | 2593372 | 2/2018 |
| EP | 3323756 | 5/2018 |
| JP | 2006243873 | 9/2006 |
| JP | 2017019586 | 1/2017 |
| WO | 9616387 | 5/1996 |
| WO | 2008038017 | 4/2008 |
| WO | 2010114478 | 10/2010 |
| WO | 2017165909 | 10/2017 |
| WO | 2019010480 | 1/2019 |

OTHER PUBLICATIONS

Mohamed, "Detection and Tracking of Pallets using a Laser Rangefinder and Machine Learning Techniques", Retrieved from https://www.researchgate.net/profile/Ihab_S_Mohamed/publication/324165524_Detection_and_Tracking_of_Pallets_using_a_Laser_Rangefinder_and_Machine_Learning_Techniques/links/5ac2b5300f7e9bfc045f3547/Detection-and-Tracking-of-Pallets-using-a-Laser-Rangefinder, Sep. 22, 2017, 76 pages.

International Application No. PCT/US2018/045964, "International Search Report and Written Opinion", dated Nov. 19, 2018, 12 pages.

Anonymous, "Geo-Fence", Wikipedia, Available Online at, URL:https://en.wikipedia.Org/w/index.php7title=Geofence&oldid=768541623, Mar. 4, 2017, 3 pages.

Intermec's Intellitag RFID Technology Enables CHEP's. Global Pallet Tracking Business Wire Nov. 13, 2001: 0480.

International Search Report and Written Opinion for PCT/US2018/026461 dated Jul. 5, 2018, all pages.

International Search Report and Written Opinion for PCT/US2018/030659 dated Aug. 3, 2018, all pages.

International Search Report and Written Opinion for PCT/US2018/030672 dated Jul. 13, 2018, all pages.

International Preliminary Report on Patentability for PCT/US2018/030672 dated Nov. 14, 2019, all pages.

International Search Report and Written Opinion for PCT/US2018/031367 dated Aug. 1, 2018, all pages.

International Search Report and Written Opinion for PCT/US2018/034083 dated Oct. 24, 2018, 11 pages.

International Search Report and Written Opinion for PCT/US2018/047035 dated Oct. 31, 2018, all pages.

International Preliminary Report on Patentability for PCT/US2018/047035 dated Mar. 5, 2020, all pages.

International Search Report and Written Opinion for PCT/US2018/048832 dated Oct. 30, 2018, all pages.

International Preliminary Report on Patentability for PCT/US2018/048832 dated May 2020, all pages.

(56) References Cited

OTHER PUBLICATIONS

International Search Report and Written Opinion for PCT/US2019/068476 dated Feb. 25, 2020, all pages.
International Search Report and Written Opinion for PCT/US2020/019698 dated Jun. 30, 2020, all pages.
Jihoon et al., "Geo-Fencing: Geographical-Fencing Based Energy-Aware Proactive Framework for Mobile Devices," Quality of Service (IWQOS), 2012 IEEE 20th International Workshop, Jun. 4, 2012, pp. 1-9.
Pallet tracking leads RFID applications. (News Briefs). Knill, Bernie. Material Handling Management 57.1: 8(2). Penton Media, Inc., Penton Business Media, Inc. and their subsidiaries. (Jan. 2002).
Weber et al., "Untrusted Business Process Monitoring and Execution Using Blockchain," Medical Image Computing and Computer-Assisted Intervention—Miccai 2015 : 18th International Conference, Munich, Germany, Sep. 8, 2016, pp. 329-347.
Xin et al., "Large Visual Repository Search with Hash Collision Design Optimization", IEEE MultiMedia, IEEE Service Center, vol. 20, Issue 2, Apr. 2013, pp. 62-71.
G. Yang, K. Xu and V.O.K. Li, "Hybrid Cargo-Level Tracking System for Logistics," 2010 IEEE 71st Vehicular Technology Conference, Taipei, 2010, pp. 1-5, doi: 10.1109/VETECS.2010.5493655. (Year: 2010).
International Application No. PCT/US2018/045964, "International Preliminary Report on Patentability", dated Apr. 30, 2020, 8 pages.
GoTo Pallets inc. "The future ofthe pallet pooling industry begins with the G2 Pallet." Retrieved capture from http://gotopallets.com for the date of Oct. 1, 2016, 77 pages.
Roussel, J., "Making the Supply Chain Everyone's Business," May 9, 2014, 8 pages.
"Recommendations on the Grocery Industry Pallet System," written for the The Grocery Industry Pallet Subcommittee by Cleveland Consulting Associates, Jan. 1, 1992, 16 pages.
GoTo Pallets Marketing Brochure dated Oct. 12, 2016. Retrieved from http://gotopallets.com 8 pages.

* cited by examiner

SYSTEMS AND METHODS FOR TRACKING GOODS CARRIERS

CROSS-REFERENCE TO RELATED APPLICATION

This application claims the benefit of U.S. Provisional Patent Application No. 62/575,262, filed Oct. 20, 2017, the contents of which are hereby incorporated by reference in their entirety.

BACKGROUND

Tracking the movement of pallets through a transportation path can aid in diagnosing issues with pallet loss and recovery, pallet damage, and pallet cycle time. Various imaging devices may be used to gather images of pallet shipments from a particular source as they progress along the transportation path. However, because some of the pallets may be obscured in the images, it may be difficult to determine how many pallets are in each image, and to determine whether any pallets have been added or removed between nodes of the transportation path. Further, the images may include pallets from other sources, which may be incorrectly included in the number of pallets in an image.

SUMMARY

Provided are methods, including computer-implemented methods, devices, and computer-program products applying systems and methods for tracking pallets. According to some embodiments of the invention, a computer-implemented method for tracking goods carriers from a particular source is provided. The method includes receiving a plurality of training image files. Each of the plurality of training image files includes a respective training image that depicts a respective plurality of goods carriers from the particular source. For each of the plurality of training image files, the method includes using an artificial neural network to determine an estimated number of the respective plurality of goods carriers from the particular source in the respective training image, and determining a comparison of the estimated number of the respective plurality of goods carriers from the particular source in the respective training image with a known number of the respective plurality of goods carriers from the particular source in the respective training image. The method also includes using the comparisons to train the artificial neural network by adjusting weights associated with artificial neurons within the artificial neural network. Further, the method includes receiving a first image file generated by a first imaging device, wherein the first image file includes a first image that depicts a first plurality of goods carriers from the particular source, and the first image is associated with a transportation path having a plurality of nodes; using the trained artificial neural network to determine a first number of goods carriers from the particular source in the first image; receiving a second image file generated by a second imaging device, wherein the second image file includes a second image that depicts a second plurality of goods carriers from the particular source, and the second image is associated with the transportation path; using the trained artificial neural network to determine a second number of goods carriers from the particular source in the second image; and determining whether the first number of goods carriers from the particular source in the first image is equal to the second number of goods carriers from the particular source in the second image.

The first imaging device may be a security camera, a traffic camera, a drone, a mobile device, a laser scanner, a sonar device, a LIDAR device, a stereoscopic imager, or an RF imager. The method may also include filtering out goods carriers from third parties not associated with the particular source from the first image, and filtering out goods carriers from third parties not associated with the particular source from the second image.

The first image file may also include first data indicating a first time and a first location at which the first image was acquired, and the second image file may also include second data indicating a second time and a second location at which the second image was acquired. The method may also include determining that the first number of goods carriers from the particular source is equal to the second number of goods carriers from the particular source, and determining a temporal difference between the first time and the second time. Further, the method may include determining a spatial difference between the first location and the second location.

In addition, the method may include determining that the first number of goods carriers from the particular source in the first image is equal to the second number of goods carriers from the particular source in the second image, and verifying that the first plurality of goods carriers from the particular source in the first image is the same as the second plurality of goods carriers from the particular source in the first image by using the artificial neural network to identify an object within both the first image and the second image. The method may also include matching at least a subset of the first plurality of goods carriers from the particular source in the first image to a first type of goods carriers from the particular source, and matching at least a subset of the second plurality of goods carriers from the particular source in the second image to the first type of goods carriers from the particular source.

Further, the may include processing the first image with the artificial neural network to correct a perspective of the first image. At least one goods carrier of the first plurality of goods carriers from the particular source may be obscured within the first image.

According to some embodiments of the invention, a device is provided. The device comprises one or more processors. The device further comprises a non-transitory computer-readable medium containing instructions that, when executed by the one or more processors, cause the one or more processors to perform operations including the steps of the methods described herein.

According to some embodiments of the invention, a computer-program product is provided. The computer-program product is tangibly embodied in a non-transitory machine-readable storage medium of a device. The computer-program product includes instructions that, when executed by one or more processors, cause the one or more processors to perform operations including the steps of the methods described herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
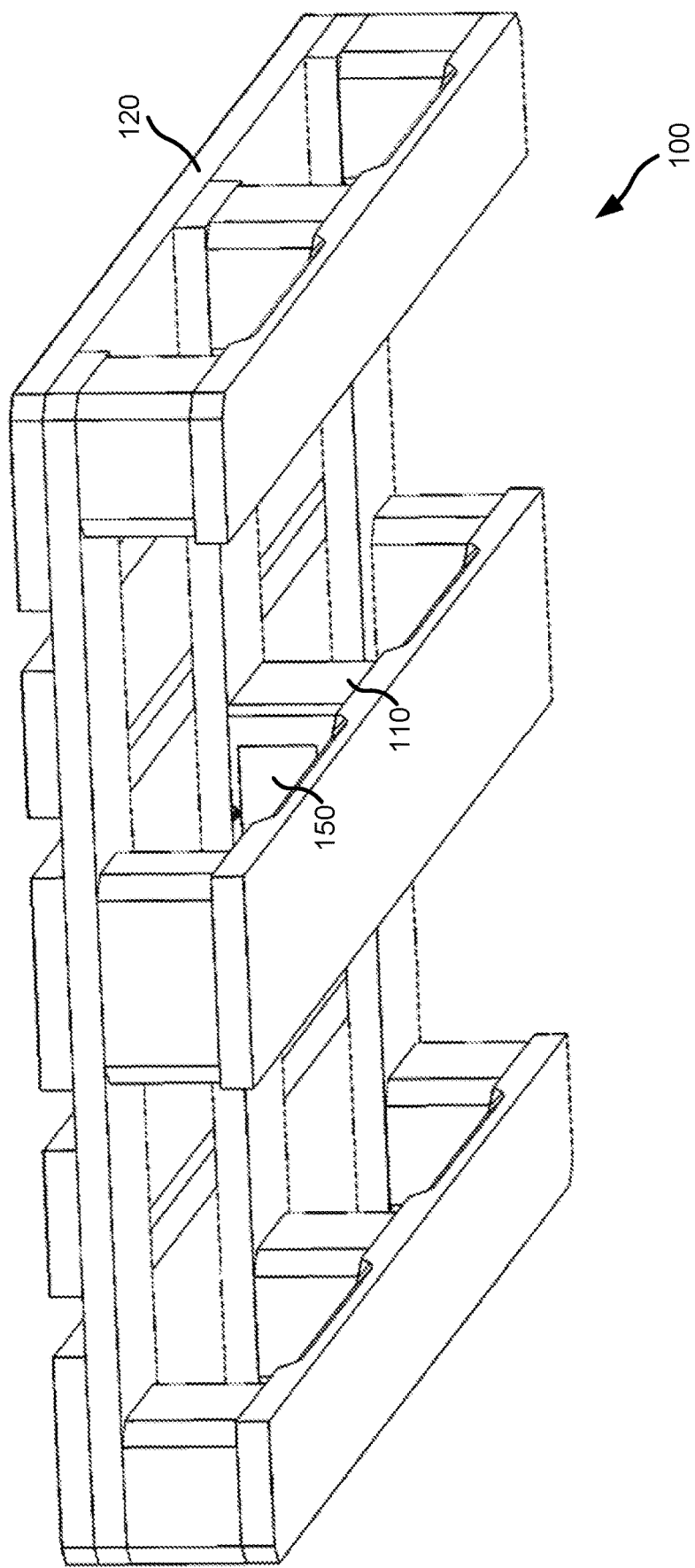
FIG. 1 is a bottom perspective view of a pallet, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Goods Carriers

A goods carrier may be a structure that supports physical assets for storage, presentation, handling, and/or transportation. As used herein, the term "goods carrier" may be used to describe any load carrier or product conveyance platform, including any type of resuable plastic container (RPC), platform, dolly, bin, keg, box (including corrugated box), container, enclosed or unenclosed tub, and the like. The physical assets may be any physical assets, such as perishable or nonperishable physical goods.

FIG. 1 is a bottom perspective view of a goods carrier 100, in accordance with some embodiments. The goods carrier 100 shown in FIG. 1 is an example of a pallet. The goods carrier 100 may include a base 120 and legs 110. The goods carrier 100 may be of any size, shape, and/or dimension, and may be made of any material or combination of materials. The base 120 and legs 110 may be of any size, shape, and/or dimensions. The base 120 may be flat and/or otherwise configured to support the shape and/or weight of the physical asset to be held on the goods carrier 100. Although shown as having a particular design in FIG. 1, it is contemplated that any design may be incorporated on or in the base 120. For example, the base 120 may have smaller, larger, fewer, more, differently shaped, or differently placed spacings than those shown in FIG. 1, depending on characteristics of the particular physical asset to be placed on the base 120 (e.g., weight, shape, temperature requirements, size, etc.).

The legs 110 may be sized and positioned to support the particular physical asset. In some embodiments, the legs 110 may be sized and positioned to allow a forklift, crane, or jacking device to engage and lift the goods carrier 100 between the legs 110. Although shown and described as having three legs 110, it is contemplated that the goods carrier 100 may have any suitable number of legs or no legs. For example, in some embodiments, the goods carrier 100 may include a base 120 on both the top and bottom of the goods carrier 100 with no legs. In another example, for heavier physical assets, the goods carrier 100 may include one or more additional legs centrally located with respect to the goods carrier 100 to prevent sagging of the base 120. Further, although shown and described as being in a particular orientation and having a particular size, it is contemplated that the legs 110 may be of any size (e.g., height, length, width, depth, etc.) and/or orientation (e.g., parallel to each other, perpendicular to each other, etc.).

The goods carrier 100 may be made of any suitable material, depending on the characteristics of the particular physical asset to be supported by the goods carrier 100. For example, the goods carrier 100 may be wooden, plastic, and/or metal. Further, the goods carrier 100 may be a half pallet or a quarter pallet. In some embodiments, the goods carrier 100 may be constructed to include unique physical features. In some embodiments, the base 120 may be made of a same or different material than the legs 110. In some embodiments, the base 120 and the legs 110 may form a single unitary body (e.g., formed from a single mold). In some embodiments, the base 120 may be removable from one or more of the legs 110.

Figure 2:
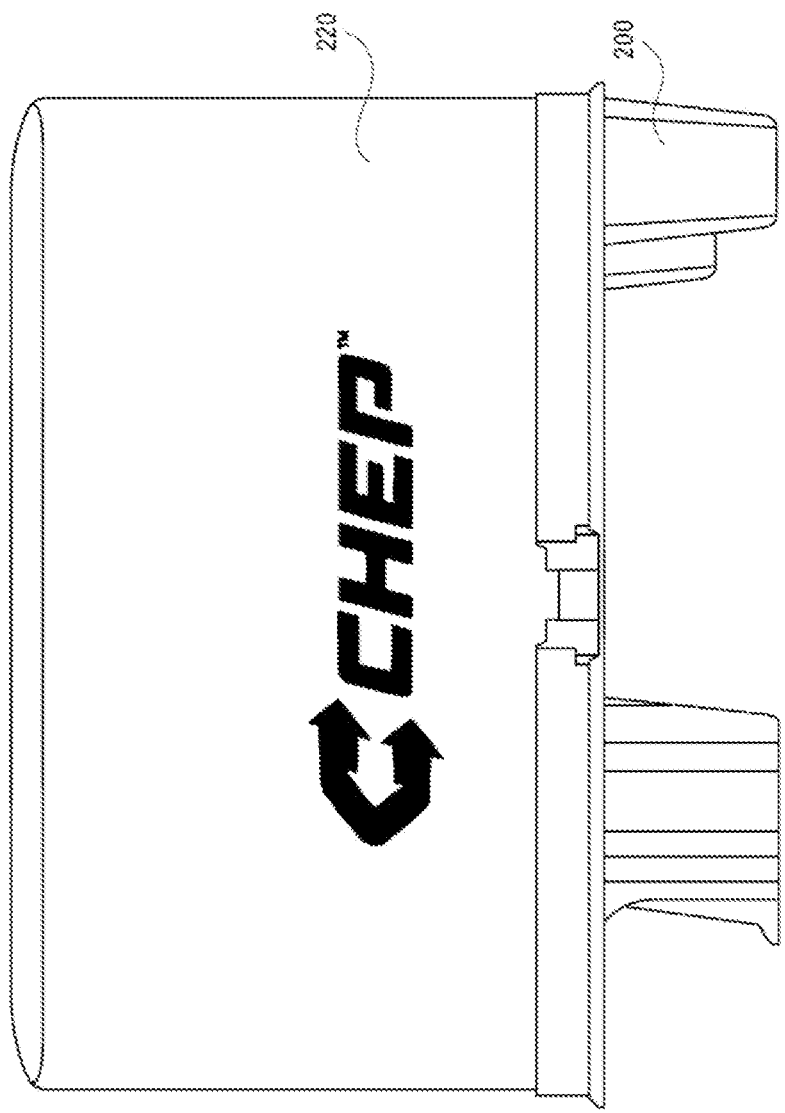
FIG. 2 is a side view of a pallet with a load, in accordance with some embodiments.

In some embodiments, additional components may be integrated with the goods carrier 100. For example, the underside of the goods carrier 100 may include a beacon 150. The beacon 150 may include any electronic device capable of handling or storing data. The beacon 150 may include a number of different functionalities. For example, the beacon 150 may be programmed with the type of physical asset located on the goods carrier 100 and/or an identifier of the goods carrier 100. The beacon 150 may further include or be in operable communication with one or more sensors configured to monitor certain conditions of the goods carrier 100 (e.g., environmental conditions, movements, etc.). The beacon 150 may be capable of communication with other devices, such as other beacons, devices, and/or servers. The beacon 150 is described further herein with respect to FIG. 3. Although shown as being located in a particular position on the goods carrier 100, it is contemplated that the beacon 150 may be located in any suitable position on the goods carrier 100. FIG. 2 is a side view of another exemplary goods carrier 200 with a load 220 placed atop the goods carrier 200 for transportation, storage, presentation, etc. As used herein, goods carrier 100 may be referred to interchangeably with goods carrier 200.

Figure 3:
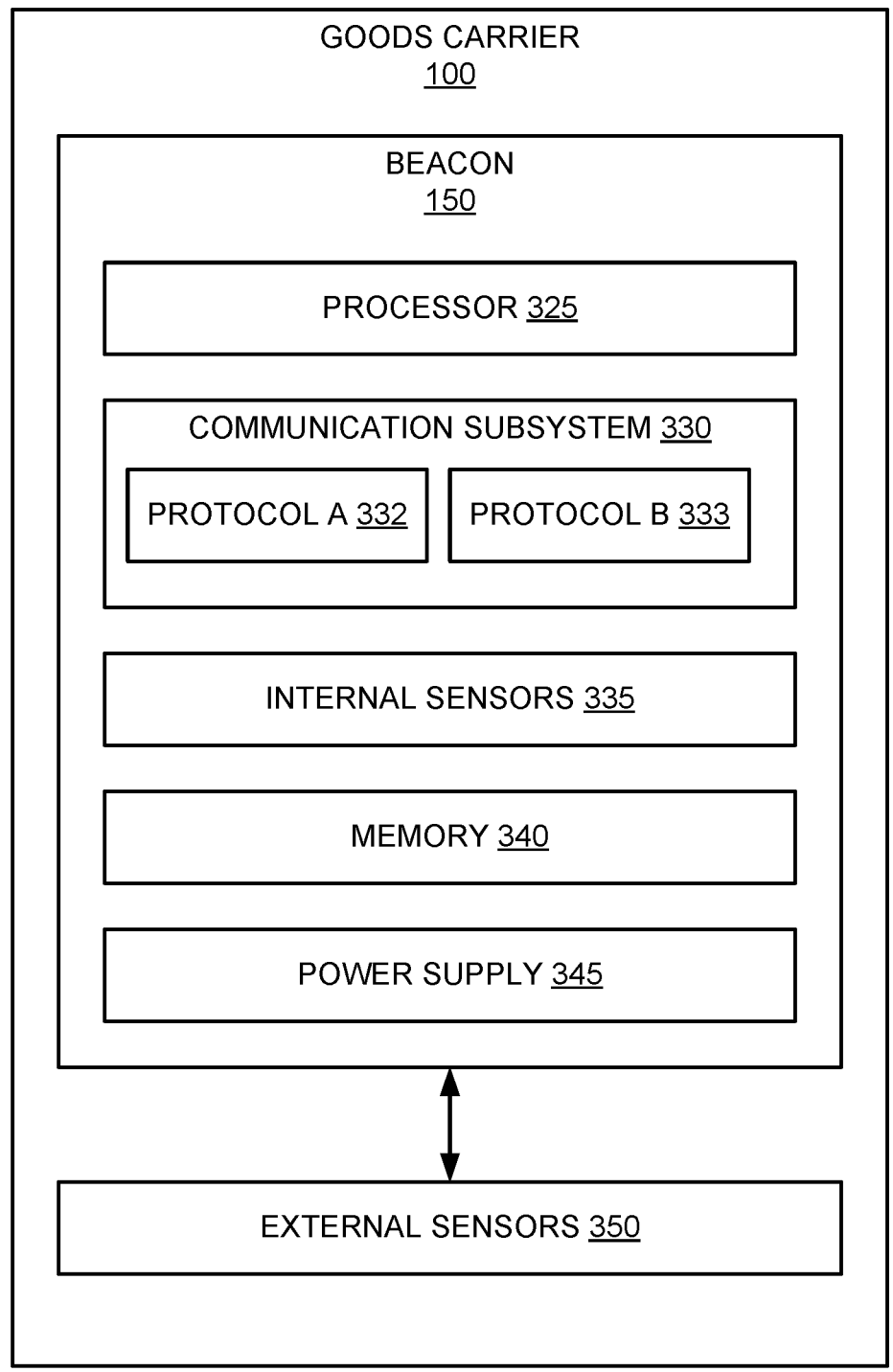
FIG. 3 is a block diagram illustrating a pallet, in accordance with some embodiments.

The goods carrier 100 and/or 200 may include components for performing multiple functions, as described herein. FIG. 3 is a block diagram illustrating the system components of the goods carrier 100 and/or 200, in accordance with some embodiments. The goods carrier 100 and/or 200 may include a beacon 150 in operative communication with one or more external sensors 350. The beacon 150 may include device hardware coupled to a memory 340. The device hardware may include a processor 325, a communication subsystem 330, internal sensors 335, and a power supply 345. In some embodiments, the beacon 150 may be implemented as an active tag (e.g., an RFID tag). The beacon 150 may be associated with an identifier (e.g., an active tag identifier).

The processor 325 may be implemented as one or more integrated circuits (e.g., one or more single core or multicore microprocessors and/or microcontrollers), and may be used to control the operation of the beacon 150. The processor 325 can execute a variety of programs in response to program code or computer-readable code stored in memory 340, and can maintain multiple concurrently executing programs or processes. The communication subsystem 330 may include one or more transceivers and/or connectors that can be used by the beacon 150 to communicate with other devices (e.g., the external sensors 350, reader pallets, beacons, access devices, etc.) and/or to connect with external networks. In some embodiments, the communication subsystem 330 may be configured to communicate using more than one protocol (e.g., protocol A 332 and protocol B 333). Protocol A 332 and protocol B 333 may be two different wired or wireless communication protocols. For example, protocol A 332 and protocol B 333 may be selected from the group including Bluetooth, Bluetooth LE, near field communication, WiFi, cellular communication, Ethernet, fiber optics, etc. In some embodiments, protocol A 332 and protocol B 333 may both be short range, lower power and/or lower cost communication protocols. The particular protocol used for a particular communication may be determined based on any of a number of factors, including availability, signal strength, type and/or amount of power received from or remaining on power supply 345, power needed to communicate on a particular protocol, cost associated with using a particular protocol, data throughput, type of data to be communicated, size of data to be communicated, and the like.

The internal sensors 335 may include any movement-related, location-related, and/or environmental-related sensors. For example, the internal sensors 335 may include a global positioning system (GPS), an accelerometer, a gyroscope, a barometer, a thermometer, a humidity sensor, a light sensor, a microphone, combinations thereof, and/or the like. The internal sensors 335 may measure, for example, position, location, velocity, acceleration, distance, rotation, altitude, temperature, humidity, pressure, sound, light, capacitance, inductance, resistance, voltage, chemical presence, combinations, thereof, and/or the like. The internal sensors 335 may be coupled to the communication subsystem 330, such that sensor measurements may be transmitted off of the goods carrier 100 to other devices or systems, as described further herein.

The memory 340 may be implemented using any combination of any number of non-volatile memories (e.g., flash memory) and volatile memories (e.g., DRAM, SRAM), or any other non-transitory storage medium, or a combination thereof media. In some embodiments, the memory 340 may be included in the processor 325. The power supply 345 may include any wired or wireless power supply, such as a power outlet supply, a solar panel, and/or a battery.

The beacon 150 may be coupled to one or more external sensors 350 on the goods carrier 100. The external sensors 350 may include, for example, a weight sensor and/or any of the sensors described above with respect to the internal sensors 335. In one example, the weight sensor may include circuitry that measures the weight of a load on the goods carrier 100. The weight sensor may transmit the weight to the beacon 150. The beacon may use the communication subsystem 330 to transmit this data off of the goods carrier 100 to other devices or systems, as described further herein.

Systems for Tracking Goods Carriers

In some cases, it may be desirable to track a plurality of goods carriers from a particular source as the goods carriers move through a transportation path having a plurality of nodes. For example, the particular source may be a manufacturer or distributor of the goods carriers. The nodes may include facilities where the goods carriers are stored at least temporarily, such as warehouses, yards, docks, stores, and recyclers. According to some embodiments of the invention, the goods carriers may be tracked through photographs without attaching physical tags or labels to the goods carriers. In particular, a plurality of goods carriers of a first type may be counted at various times and locations along the transportation path.

Figure 4:
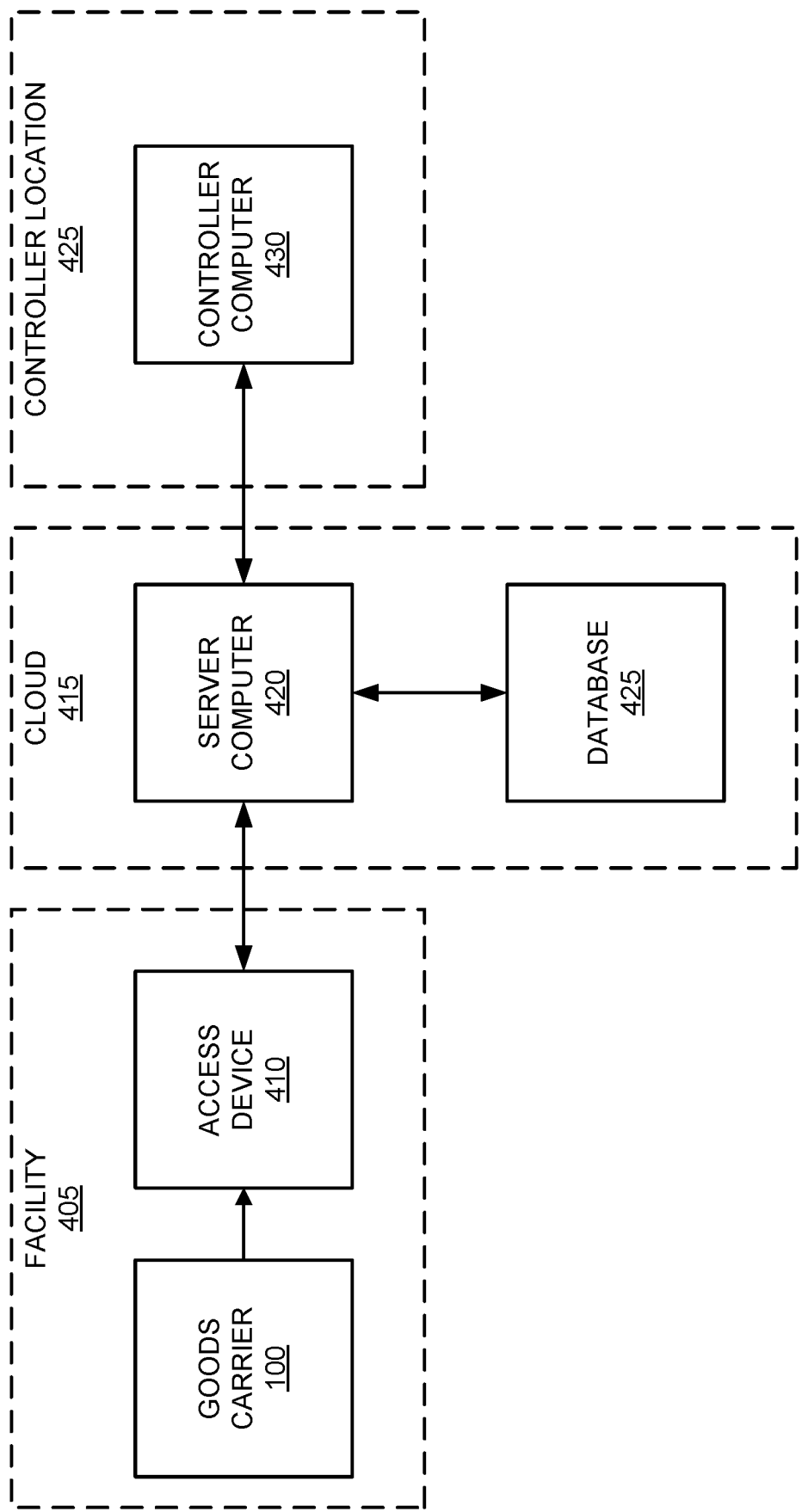
FIG. 4 is a block diagram illustrating a system for tracking pallets, in accordance with some embodiments.

FIG. 4 is a block diagram illustrating a system for tracking goods carriers, in accordance with some embodiments. The system may include an access device 410, a server computer 420, a database 425, and a controller computer 430. The goods carrier 100 and the access device 410 may be located at a facility 405 in the transportation path, such as a warehouse or store. Although only a single goods carrier 100 is shown in FIG. 4, it should be understood that the system analyzes a plurality of goods carriers as a group. The plurality of goods carriers may be arranged in a stack. The server computer 420 and the database 425 may be located in the cloud, such as at one or more offsite or third party locations with online or networked storage. The controller computer 430 may be located at a controller location 425, such as at a goods carrier logistics and tracking company. Although shown and described with respect to a certain number of entities performing certain functions, it is contemplated that a greater or fewer number of entities may perform the functions described herein. For example, the functions of the server computer 420 may be spread across multiple server computers. In another example, the database 425 may be incorporated internally to the server computer 420. In still another example, the functions of the server computer 420 may be partially or wholly be performed by the access device 410.

In some embodiments, one of the goods carriers 100 within the plurality of goods carriers may communicate data to the access device 410 to cause the access device 410 to perform one or more operations. For example, the goods carrier 100 may communicate (or cause to be communicated) a signal indicating that the goods carrier 100 is within a visual range of the access device 410. The signal may be communicated, for example, by a Bluetooth or Bluetooth LE tag on the goods carrier 100. When the access device 410 receives the signal, the access device 410 may capture an image of the plurality of goods carriers, including goods carrier 100, using a camera or other image capture hardware and/or software, as described further herein. In some embodiments, the goods carrier 100 may not include a tag capable of short range communication. Thus, the access device 410 may be manually caused to capture an image of the plurality of goods carriers in some embodiments (e.g., by selecting an image capture option on the user interface). This may happen at any time or interval, such as when the goods carrier 100 enters the facility 405, when the goods carrier 100 is leaving the facility 405, once a day, etc.

The access device 410 may be any suitable electronic user device. The access device 410 may include a communication device. A communication device may provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of devices include mobile phones (e.g., cellular phones), PDAs, tablet computers, net books, laptop computers, personal music players, handheld specialized readers, watches, fitness bands, wearables, ankle bracelets, rings, earrings, key fobs, physical wallets, glasses, containers, coffee mugs, takeout containers, etc., as well as automobiles with remote communication capabilities. The access device 410 may comprise any suitable hardware and software for performing such functions, and may also include multiple devices or components (e.g., when a device has remote access to a network by tethering to another device—i.e., using the other device as a modem—both devices taken together may be considered a single communication device). Further examples of an access device 410 may include a POS or point of sale device (e.g., POS terminals), cellular phone, PDA, personal computer (PCs), tablet PC, handheld specialized reader, set-top box, electronic cash register (ECR), virtual cash registers (VCR), kiosk, and the like.

The access device 410 may have an application installed that allows it to upload the image file depicting the goods carriers to a server computer 420. The server computer 420 may include a machine learning system, such as an artificial neural network, and may process an image within the image file to filter out goods carriers from third parties not associated with the particular source from the plurality of goods carriers; match at least a subset of the plurality of goods carriers to a first type of goods carriers from the particular source; and determine a number of goods carriers of the first type in the image. The server computer 420 may access a database 425 storing training image files including a respective plurality of training images in association with a known number of training goods carriers that are depicted in the respective training image. The server computer 420 may use the training image files to train the machine learning system to count the number of training goods carriers of the first type in subsequently acquired images.

The server computer 420 may generate data associated with the goods carriers in the images, and store the data as an entry in the database 425 corresponding to the associated image file. For example, the server computer 420 may generate data noting differences between the times and locations at which image files depicting the same goods carriers were acquired. In another example, the server computer 420 may generate location data for the goods carriers (e.g., data indicative of the facility 405). In some embodiments, the server computer 420 may provide this data from the database 425 to a controller computer 430. The controller computer 430 may be an entity that tracks, maintains, and/or owns the goods carriers. The controller computer 430 may use this data to determine whether the goods carriers are at the correct facility 405, to determine where the goods carriers are in the transportation path, to determine the cycle time of the goods carriers, to predict timing of the goods carriers at a particular location, to determine whether all of the goods carriers are still in the same shipment, etc.

In some embodiments, the functions of the server computer 420 may be performed wholly or partially by the access device 410. For example, in some embodiments, the size of the transmission sent to the server computer 420 by the access device 410 may be reduced by performing the image processing on the access device 410. The resulting data, which may have a small memory footprint, may then be transmitted to the server computer 420 and run through the database 425.

Figure 5:
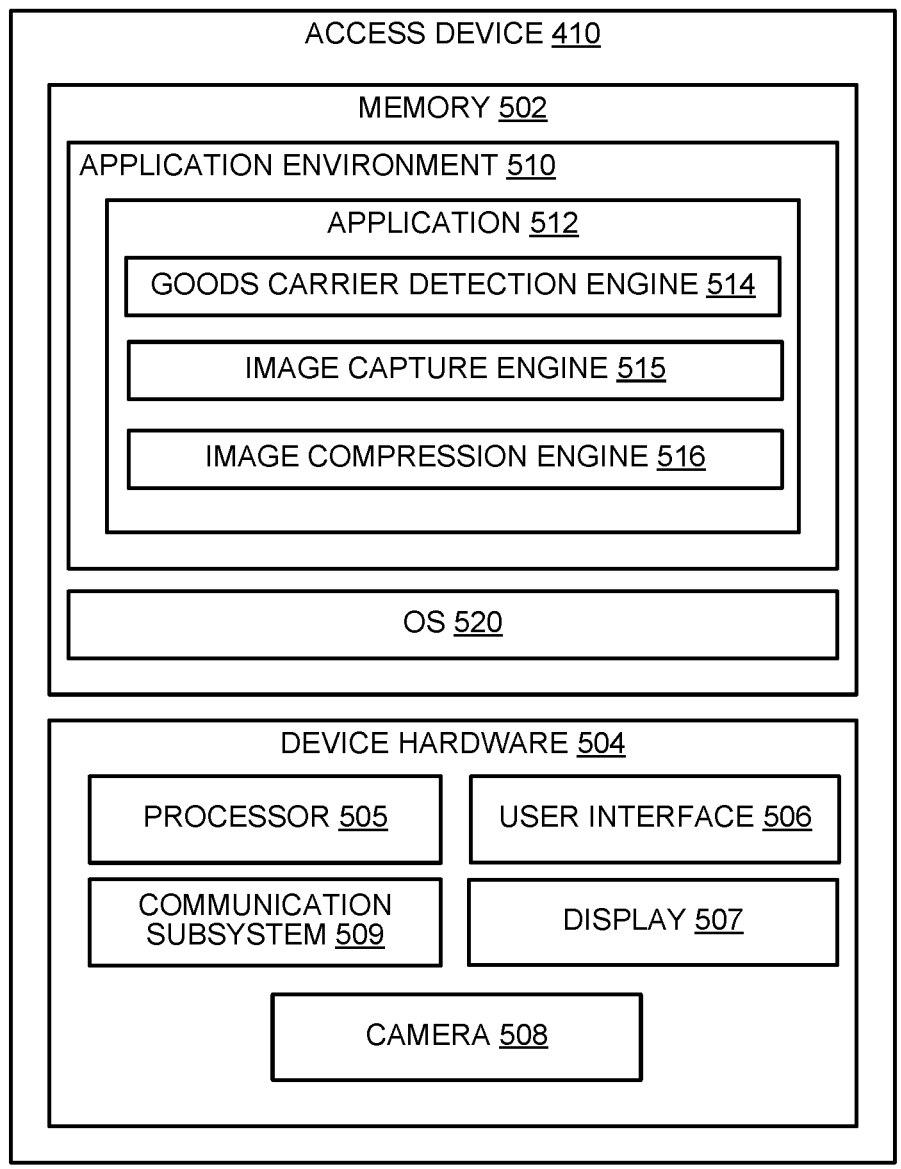
FIG. 5 is a block diagram illustrating an access device, in accordance with some embodiments.

FIG. 5 is a block diagram illustrating an access device 410, in accordance with some embodiments. The access device 410 may include device hardware 504 coupled to a memory 502. Device hardware 504 may include a processor 505, a camera 508, a communication subsystem 509, and a user interface 506. In some embodiments, device hardware 504 may include a display 507 (which can be part of the user interface 506).

Processor 505 can be implemented as one or more integrated circuits (e.g., one or more single core or multicore microprocessors and/or microcontrollers), and is used to control the operation of the access device 410. Processor 505 can execute a variety of programs in response to program code or computer-readable code stored in memory 502, and can maintain multiple concurrently executing programs or processes. Communication subsystem 509 may include one or more transceivers and/or connectors that can be used by access device 410 to communicate with other devices (e.g., the goods carrier 100) and/or to connect with external networks (e.g., to connect to the server computer 420). User interface 506 can include any combination of input and output elements to allow a user to interact with and invoke the functionalities of the access device 410. In some embodiments, user interface 506 may include a component such as display 507 that can be used for both input and output functions. Camera 508 may be implemented as hardware in conjunction with software to capture visual features and/or images of goods carriers, for example, as described further herein. Memory 502 can be implemented using any combination of any number of non-volatile memories (e.g., flash memory) and volatile memories (e.g., DRAM, SRAM), or any other non-transitory storage medium, or a combination thereof media. Memory 502 may store an operating system (OS) 520 and an application environment 510 where one or more applications reside including application 512 to be executed by processor 505.

In some embodiments, application 512 may be an application that captures, stores, and/or transmits images of goods carriers for visual identification and tracking in a cloud environment. Application 512 may include a goods carrier detection engine 514, an image capture engine 515, and an image compression engine 516. In some embodiments, one or more of these components can be provided by another application or component that is not part of application 512.

The goods carrier detection engine 514 may be configured to, in conjunction with the processor 505 and the communication subsystem 509, receive a ping (i.e., a brief signal) from a goods carrier in proximity to the access device 410. In some embodiments, the goods carrier may be configured to send a ping to the communication subsystem 509 when within a certain distance of the access device 410 (e.g., 10 feet). In some embodiments, the goods carrier may be configured to send a ping to the communication subsystem 509 when within any communication range of the access device 410 (e.g., 50 feet), and the goods carrier detection engine 514 may monitor the distance between the access device 410 and the goods carrier based on the pings. In some embodiments, when the goods carrier is detected by the goods carrier detection engine 514, the goods carrier detection engine 514 may transmit an image capture signal to the image capture engine 515. In some embodiments, when the goods carrier is detected by the goods carrier detection engine 514 to be at a particular distance from the access device 410 and/or in a particular orientation with respect to the access device 410 (which may be inferred from data collected by sensors on the goods carrier, such as accelerometers, gyroscopes, etc.), the goods carrier detection engine 514 may transmit an image capture signal to the image capture engine 515.

The image capture engine 515 may be configured to, in conjunction with the processor 505, receive an image capture signal from the goods carrier detection engine 514 based on detection of the goods carrier. In response to receiving the image capture signal, the image capture engine 515 may capture an image of the goods carrier, along with the other goods carriers that may be arranged together in a stack. The goods carrier may include a Bluetooth LE tag programmed to send a ping (either on its own initiative or in response to a ping from the access device 410) when it is within six feet of the access device 410. Thus, when the goods carrier is directly below the access device 410, the goods carrier may transmit a ping to the access device 410 (e.g., via the goods carrier detection engine 514). The goods carrier detection engine 514 may transmit an image capture signal to the image capture engine 515. The image capture engine 515 may then cause the camera 508 to capture an image of the goods carrier as the goods carrier moves through the transportation path.

Although described as an automated process using the goods carrier detection engine 514 and the image capture engine 515, it is contemplated that in some embodiments, the goods carrier detection engine 514 may be omitted. In these embodiments, the image capture engine 515 may include software that allows a user to manually initiate image captures using the camera 508. For example, a user may approach a plurality of goods carriers with the access device 410, and select an option on the user interface 506 that activates that image capture engine 515 and captures an image of the goods carriers using the camera 508.

In some embodiments, the application 512 may further include an image compression engine 516. The image compression engine 516 may be configured to, in conjunction with the processor 505, compress images captured by the camera 508 to a lower data size and/or resolution. In some embodiments, the images captured by the camera 508 may be very high resolution. However, such a high resolution may not be needed in order to analyze the visual features of the goods carriers captured in the images. Thus, the image compression engine 516 may compress the images to a lower resolution that is still suitable for analysis (i.e., to the smallest resolution in which the visual features of the goods carriers may still be identified and the number of goods carriers may be counted). Such compression may also reduce transmission time of the images off of the access device 410. The compression may be lossless compression, in one embodiment. Possible compression modes include JPLL (JPEG lossless), JLSL (JPEG-LS Lossless), J2KR (JPEG 2000 Lossless), and JPLY (JPEG Lossy).

Figure 6A:
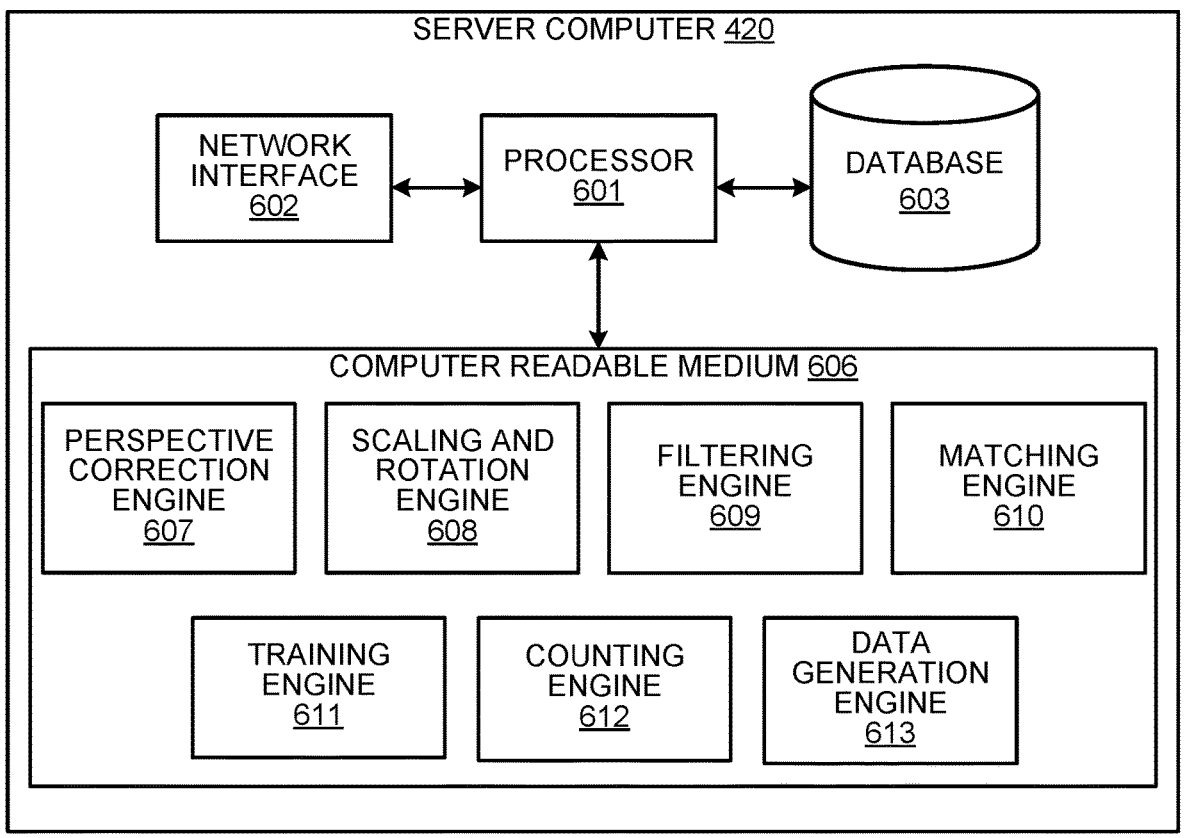
FIG. 6A is a block diagram illustrating a server computer, in accordance with some embodiments.

FIG. 6A is a block diagram illustrating a server computer 420, in accordance with some embodiments. Server computer 420 may include a processor 601 coupled to a network interface 602 and a computer readable medium 606. Server computer 420 may also include or otherwise have access to a database 603 that may be internal or external to the server computer 420.

Processor 601 may include one or more microprocessors to execute program components for performing the goods carrier tracking functions of the server computer 420. For example, processor 601 may include a Graphical Processing Unit (GPU). Network interface 602 may be configured to connect to one or more communication networks to allow the server computer 420 to communicate with other entities, such as the access device, the controller computer, etc.

Computer readable medium 606 may include any combination of one or more volatile and/or non-volatile memories, for example, RAM, DRAM, SRAM, ROM, flash, or any other suitable memory components. Computer readable medium 606 may store code executable by the processor 601 for implementing some or all of the image analysis functions of server computer 420. For example, computer readable medium 606 may include code implementing a perspective correction engine 607, a scaling and rotation engine 608, a filtering engine 609, a matching engine 610, a training engine 611, a counting engine 612, and a data generation engine 613. Although not shown, the computer readable medium 606 may also include code implementing various other computer vision algorithms, such as warping, filtering, edge detection, homography, and feature matching.

The perspective correction engine 607 may be configured to, in conjunction with the processor 601, receive an image of goods carriers in an image file from an access device. The perspective correction engine 607 may be configured to correct for the perspective of the imaging device that was used to acquire the image file. For example, computer vision techniques may be used to correct skew in the image. This may result in the image including three sides of a goods carrier, such as the front, top, and lateral sides, and the sides may be undistorted. The perspective correction may use a plurality of images of the same goods carriers that were acquired at the same time by imaging devices with different perspectives.

The scaling and rotation engine 608 may be configured to, in conjunction with the processor 601, receive an image of goods carriers in an image file from an access device. The scaling and rotation engine 608 may be configured to scale, rotate, crop and/or align the image of the goods carriers to meet particular criteria or standards. For example, the scaling and rotation engine 608 may resize the image of the goods carriers to be a particular standard size, such as 1000 pixels by 1000 pixels. In another example, the scaling and rotation engine 608 may be configured to crop the image of the goods carriers such that only the goods carriers are shown (i.e., eliminating background images). In another example, the scaling and rotation engine 608 may be configured to align the image of the goods carriers such that the edges of a stack of the goods carriers are viewed as being horizontally and vertically oriented. In another example, the scaling and rotation engine 608 may be configured to rotate the image of the goods carriers clockwise and/or counter-clockwise to change which side of the stack of goods carriers is seen as being the "top" and "bottom", i.e., a 90, 180 or 270 degree rotation. The image may be rotated into a standard orientation used for analysis, e.g., with a logo, arrow or other marking being right side up. In some embodiments, it may not be necessary to scale, rotate, crop and/or align the image for analysis. In such embodiments, it is contemplated that the scaling and rotation engine 608 may be omitted.

The filtering engine 609 may be configured to, in conjunction with the processor 601 and the network interface 602, receive the image of the goods carriers in the image file. The filtering engine 609 may be configured to analyze the image to filter out goods carriers from third parties that are not associated with the particular source of the goods carriers. The filtering may be based on visual features of any unique characteristics or combination of characteristics that are together unique to the particular source. Such visual features may include size, color, shape, dimensions, text, graphics, textures, levels, depressions, nail location pattern, paint, board orientation, combinations thereof, and/or the like. For example, an aspect ratio of two edges of a goods carrier may be used to identify the source of the goods carrier. With respect to a goods carrier either partially or fully formed of wood, the visual features may include wood grain marks and patterns, such as a direction of the wood cells (e.g., straight grain, spiral grain, interlocked, etc.), surface appearance, growth ring placement, plane of the cut (quarter sawn, flat sawn, end grain, etc.), rate of growth, relative cell size, etc. It is contemplated that any number of visual features may be identified. In general, a higher probability of screening out another source of goods carriers with greater accuracy may result if more visual features are identified. The filtering engine 609 may be configured to indicate one or more of the visual features in the image and/or the image file. For example, the filtering engine 609 may be configured to indicate the visual features in the image (e.g., by outlining each of the identified visual features, by adding arrows pointing to each of the visual features, etc.). In another example, the feature identification engine 609 may be configured to indicate the visual features in a file separate from or combined with the image file (e.g., by listing pixel coordinates and/or areas in which the identified visual features are located). It is contemplated that the filtering engine 609 may be implemented using computer vision analysis and/or artificial neural networks, such as deep neural networks.

The matching engine 610 may be configured to, in conjunction with the processor 601, receive the filtered image from the filtering engine 609. The matching engine 610 may be configured to analyze the image to match at least a subset of the remaining goods carriers to a first type of goods carriers from the particular source. Similar to the filtering, the matching may be based on visual features of any unique characteristics or combination of characteristics that are together unique to the first type of goods carriers. Such visual features may include size, color, shape, dimensions, text, graphics, textures, levels, depressions, nail location pattern, paint, board orientation, combinations thereof, and/or the like. With respect to a goods carrier either partially or fully formed of wood, the visual features may include wood grain marks and patterns, such as a direction of the wood cells (e.g., straight grain, spiral grain, interlocked, etc.), surface appearance, growth ring placement, plane of the cut (quarter sawn, flat sawn, end grain, etc.), rate of growth, relative cell size, etc. It is contemplated that any number of visual features may be identified. In general, a higher probability of matching goods carriers with greater accuracy may result if more visual features are identified. The matching engine 610 may be configured to indicate one or more of the visual features in the image and/or the image file. For example, the matching engine 610 may be configured to indicate the visual features in the image (e.g., by outlining each of the identified visual features, by adding arrows pointing to each of the visual features, etc.). In another example, the matching engine 610 may be configured to indicate the visual features in a file separate from or combined with the image file (e.g., by listing pixel coordinates and/or areas in which the identified visual features are located). It is contemplated that the matching engine 610 may be implemented using computer vision analysis and/or artificial neural networks, such as deep neural networks.

The training engine 611 may be configured to, in conjunction with the processor 601, access the database 603 to retrieve training image files including a respective plurality of training images in association with a known number of training goods carriers that are depicted in the respective training image. The training engine 611 may use the training image files to train the machine learning system, such as an artificial neural network, to count the number of goods carriers from the particular source in subsequently acquired images. The training image files may include two-dimensional and/or three-dimensional images.

Figure 6B:
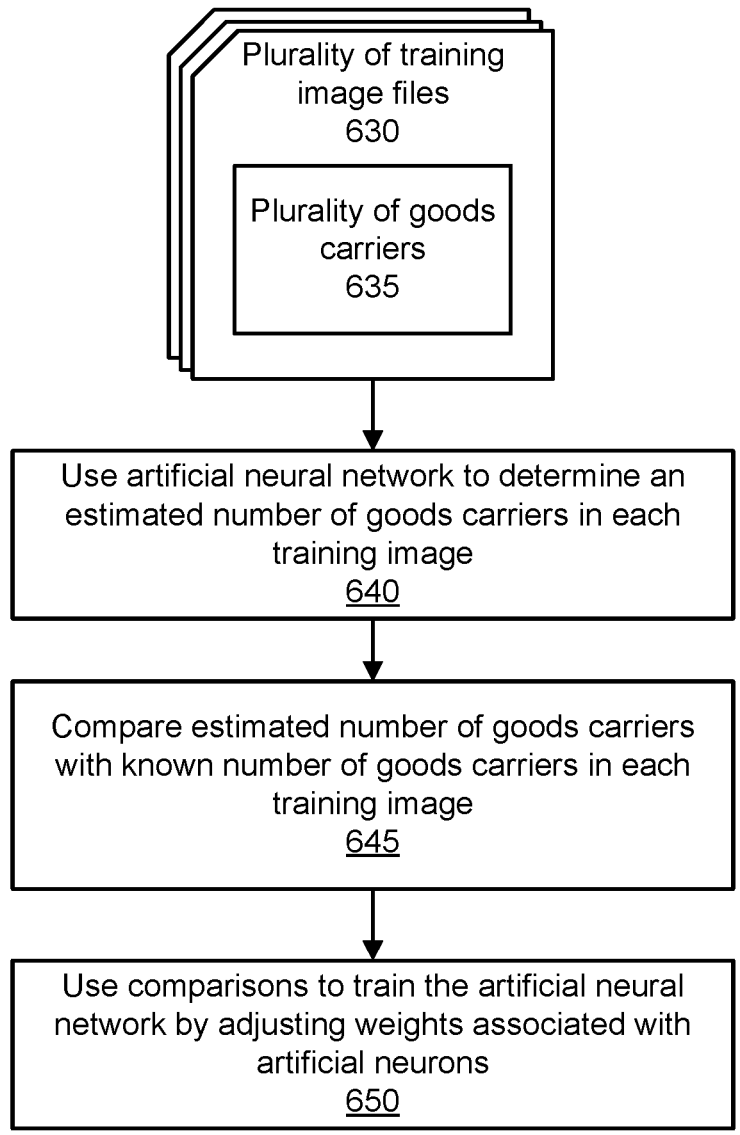
FIG. 6B is a flow chart illustrating a method for training an artificial neural network, in accordance with some embodiments.

For example, FIG. 6B is a flow chart illustrating a method for training an artificial neural network, in accordance with some embodiments. A plurality of image training files 630 is received by a suitable device, such as a computer or a server, which may be located in a cloud. Each of the plurality of image training files 630 may include a respective training image that depicts a respective plurality of goods carriers 635. The respective plurality of goods carriers 635 may be arranged in a stack. At least one goods carrier of the respective plurality of goods carriers 635 may be obscured within the respective training image. For example, the goods carrier may be obscured by other goods carriers or by another object within the training image. In some embodiments, each goods carrier may not include a physical tag showing or storing a goods carrier identifier. In other words, the goods carrier may not have a direct visual or electronic means of providing its identity.

The plurality of training image files 630 may have been generated by an imaging device located at a facility housing the plurality of goods carriers 635 in a transportation path. For example, the imaging device may be a security camera in a warehouse or a yard owned by the particular source or a third party. In some embodiments, the imaging device may be incorporated in a mobile device (e.g., a smartphone), and may be used in a warehouse or a yard, or at any other point along the transportation path. The imaging device may also be a traffic camera, such as a traffic camera that is mounted on a traffic light along the transportation path. Further, the imaging device may be a drone that is flown above the transportation path, or moved along any suitable surface, such as the ground, a wall, or an elevated track that is suspended from a ceiling. For example, multiple drones may be launched from a vehicle in order to image the primary locations where goods carriers may accumulate within a geographical area, such as a city. In addition, the imaging device may be a dashcam in a human-operated vehicle or an autonomous vehicle. Other examples of imaging devices may include laser scanners, sonar, LIDAR, and stereoscopic imagers. Some imaging devices may be used to acquire images through barriers such as walls or ceilings, such as RF imagers, and the images may be transmitted by any suitable method, such as over a WiFi network. In some embodiments, the perspective of the plurality of training image files 630 may be corrected, and/or the plurality of training image files 630 may be rotated, cropped, aligned and/or scaled. The plurality of training image files 630 may have been generated by a single imaging device or a plurality of imaging devices at different locations.

At process block 640, for each of the plurality of training image files 630, a machine learning system, such as an artificial neural network, may be used to determine an estimated number of the respective plurality of goods carriers 635 from the particular source in the respective training image. Various aspects may be used to estimate the number of the respective plurality of goods carriers 635, such as the location at which the respective training image file was acquired, the date and/or time at which the respective training image file was acquired, the number of corners that are visible in the respective training image file, the angle between the imaging device and at least one of the plurality of goods carriers 635, the distance between the imaging device and at least one of the plurality of goods carriers 635, the height of at least one of the plurality of goods carriers 635, the depth of at least one of the plurality of goods carriers 635, the facility and/or the personnel who assembled the plurality of goods carriers 635, the structure of the stack(s) of the plurality of goods carriers 635, etc.

At process block 645, for each of the plurality of training image files 630, the estimated number of the respective plurality of goods carriers 635 in the respective training image may be compared with a known number of the respective plurality of goods carriers 635 in the respective training image. The known number of the respective plurality of goods carriers 635 may be obtained from various sources, such as a manual count of the respective plurality of goods carriers 635, a predetermined count of the number of goods carriers in a stack, a count of the number of the respective plurality of goods carriers 635 as they are grouped together, signals received from transmitters on each of the respective plurality of goods carriers 635, etc.

At process block 650, the comparisons of the estimated number of the respective plurality of goods carriers 635 with the known number of the respective plurality of goods carriers 635 in the respective training image may be used to train the artificial neural network by adjusting weights associated with artificial neurons within the artificial neural network. Any suitable artificial neural network may be used, such as TensorFlow™. The weights may be set to any suitable initial values. For example, the weights may be adjusted to reduce or minimize a loss function of the artificial neural network. Some methods that may be used to adjust the weights include the gradient descent method, Newton's method, the conjugate gradient method, the quasi-Newton method, and the Levenberg-Marquardt algorithm.

Returning to FIG. 6A, the counting engine 612 may be configured to, in conjunction with the processor 601, receive the filtered and/or matched image from the filtering engine 609 and/or the matching engine 610. The counting engine 612 may be configured to use the trained artificial neural network to count the number of goods carriers in the image. For example, the counting engine 612 may identify rectangular boxes that represent the side of a goods carrier. Further, the counting engine 612 may estimate the depth of the goods carriers in the image, and may use the front goods carrier and the depth of a plurality of goods carriers to determine the number of goods carriers in the image. The analysis may be performed on an image whose perspective was corrected by the perspective correction engine 607, in order to facilitate the identification of the rectangular boxes and to provide a more accurate estimate of the depth. The counting engine 612 may identify a corner of a goods carrier in a two-dimensional image, and identify two sides adjacent to the corner as belonging to the same goods carrier. Alternatively or in addition, the counting engine 612 may utilize any of the aspects discussed above with respect to estimating the number of goods carriers in an image.

The data generation engine 613 may be configured to, in conjunction with the processor 601, generate data associated with the goods carriers once the goods carriers have been counted. The data may include, for example, location data (i.e., where the goods carriers were when each image was captured, e.g., at a particular shipper, carrier, manufacturer, and/or facility), whether the goods carriers are currently in the transportation path, a cycle time of the goods carriers to move through the transportation path, changes to the visual features on the goods carriers, new visual features on the goods carriers, damage to the goods carriers, whether any of the goods carriers are missing from the shipment, combinations thereof, and/or the like. The data generation engine 613 may be configured to store the data as an entry in the database 603 corresponding to the goods carriers.

Methods for Tracking Goods Carriers

Figure 7:
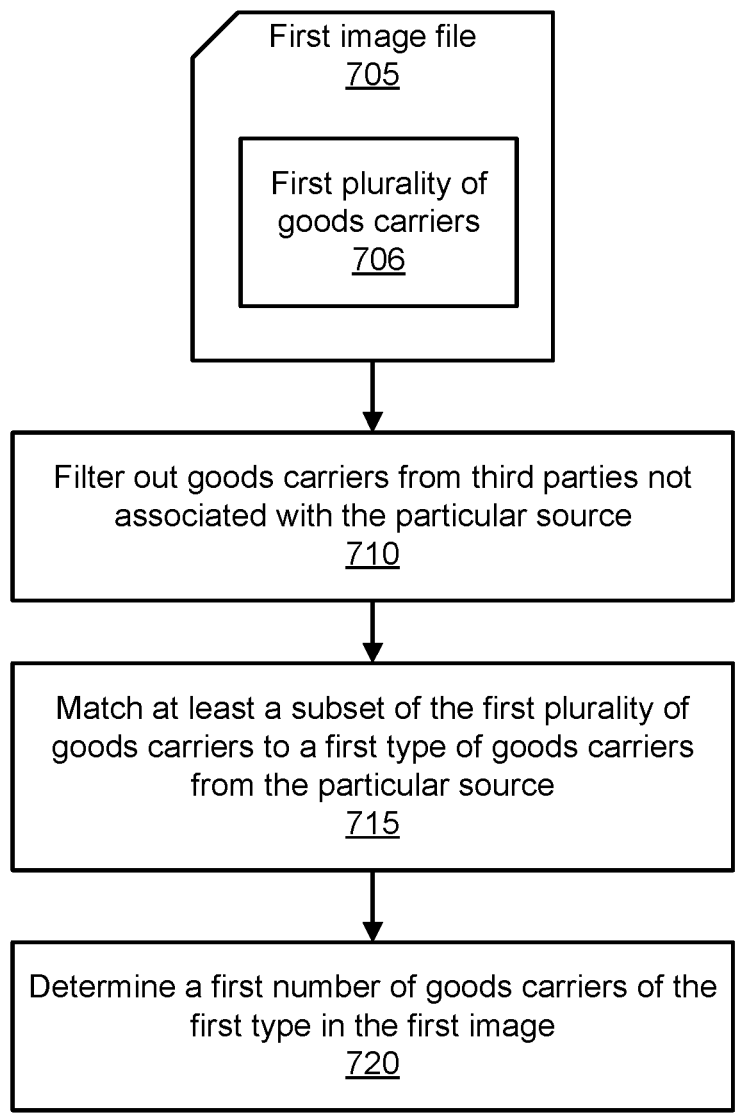
FIG. 7 is a flow chart illustrating a method for pallet tracking, in accordance with some embodiments.

A variety of methods may be implemented by the above-described systems. FIG. 7 is a flow chart illustrating an exemplary method for goods carrier tracking, in accordance with some embodiments. Various methods track goods carriers by counting the number of goods carriers belonging to a particular source in images acquired along a transportation path having a plurality of nodes. The nodes may include places where the goods carriers are stored, such as warehouses, yards, docks, and recycling facilities. After an artificial neural network has been trained, a first image file 705 is received by a suitable device, such as a computer or a server, which may be located in a cloud. The first image file 705 may include a first image that depicts a first plurality of goods carriers 706. The first plurality of goods carriers 706 may be arranged in a stack. At least one goods carrier of the first plurality of goods carriers 706 may be obscured within the first image. For example, the goods carrier may be obscured by other goods carriers or by another object within the first image. In some embodiments, each goods carrier may not include a physical tag showing or storing a goods carrier identifier. In other words, the goods carrier may not have a direct visual or electronic means of providing its identity.

The first image file 705 may have been generated by an imaging device located at a facility housing the first plurality of goods carriers 706 in a transportation path. For example, the imaging device may be a security camera in a warehouse or a yard owned by the particular source or a third party. In some embodiments, the imaging device may be incorporated in a mobile device (e.g., a smartphone), and may be used in a warehouse or a yard, or at any other point along the transportation path. The imaging device may also be a traffic camera, such as a traffic camera that is mounted on a traffic light along the transportation path. Further, the imaging device may be a drone that is flown above the transportation path, or moved along any suitable surface, such as the ground, a wall, or an elevated track that is suspended from a ceiling. For example, multiple drones may be launched from a vehicle in order to image the primary locations where goods carriers may accumulate within a geographical area, such as a city. In addition, the imaging device may be a dashcam in a human-operated vehicle or an autonomous vehicle. Other examples of imaging devices may include laser scanners, sonar, LIDAR, and stereoscopic imagers. Some imaging devices may be used to acquire images through barriers such as walls or ceilings, such as RF imagers, and the images may be transmitted by any suitable method, such as over a WiFi network. In some embodiments, the perspective of the first image file 705 may be corrected, and/or the first image file 705 may be rotated, cropped, aligned and/or scaled.

At process block 710, goods carriers from third parties that are not associated with the particular source may be filtered out of the first image, such that goods carriers from third parties are not included in the count of the number of goods carriers. The filtering may be performed by a machine learning system, such as an artificial neural network. The goods carriers from third parties may be identified based on various identifying features, such as the size, shape, and/or color of the goods carriers. The goods carriers from third parties may also be identified by markings, such as letters, numbers, and/or symbols on the goods carriers. At process block 715, the machine learning system may match at least a subset of the remaining goods carriers to a first type of goods carriers from the particular source. The matching may be performed by a machine learning system, such as an artificial neural network. For example, the first type of goods carriers may be wooden pallets, plastic pallets, display pallets, automotive pallets, or aviation pallets. The first type of goods carriers may be identified based on various identifying features, such as the size, shape, and/or color of the goods carriers. The first type of goods carriers may also be identified by markings, such as letters, numbers, and/or symbols on the goods carriers.

At process block 720, a first number of goods carriers of the first type in the first image may be determined. The determination may be made by the machine learning system. For example, the machine learning system may be trained by inputting a plurality of training image files that include a respective plurality of training images, along with a known number of goods carriers of the first type that are depicted in each training image. After this training, the machine learning system can count the number of goods carriers of the first type in the first image file 705.

The methods described above may be used to track the location of goods carriers from the particular source. For example, by counting the number of goods carriers of the first type in the first image at process block 720, it may be determined that a particular set or shipment of goods carriers of the first type is present at the location where the first image file 705 was acquired at the time that the first image file 705 was acquired. For this purpose, the first image file 705 may include first data indicating a first time and a first location at which the first image was acquired. It may also be determined whether all of the goods carriers in the initial shipment are still together, or whether some of the goods carriers have become separated from the initial shipment.

Figure 8:
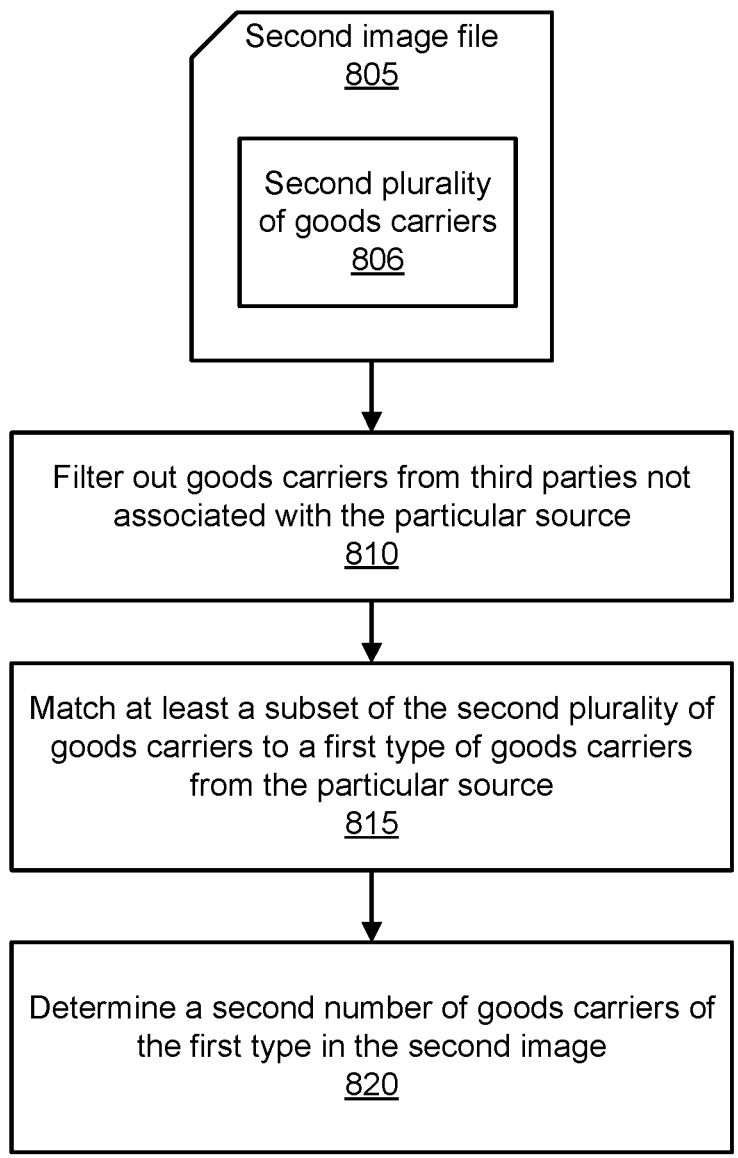
FIG. 8 is a flow chart illustrating another method for pallet tracking, in accordance with some embodiments.

The methods described above may be repeated any number of times to track a particular set or shipment of goods carriers as it moves along the transportation path. FIG. 8 is a flow chart illustrating another exemplary method for goods carrier tracking, in accordance with some embodiments. The method described with regard to FIG. 8 may be similar to the method described with regard to FIG. 7. A second image file 805 is received by a suitable device, such as a computer or a server, which may be located in a cloud. The second image file 805 may include a second image that depicts a second plurality of goods carriers 806. The second plurality of goods carriers 806 may be arranged in a stack. At least one goods carrier of the second plurality of goods carriers 806 may be obscured within the second image. For example, the goods carrier may be obscured by other goods carriers or by another object within the second image. In some embodiments, each goods carrier may not include a physical tag showing or storing a goods carrier identifier. In other words, the goods carrier may not have a direct visual or electronic means of providing its identity.

The second image file 805 may have been generated by an imaging device located at a facility housing the second plurality of goods carriers 806 in the transportation path. For example, the imaging device may be a security camera in a warehouse or a yard owned by the particular source or a third party. In some embodiments, the imaging device may be incorporated in a mobile device (e.g., a smartphone), and may be used in a warehouse or a yard, or at any other point along the transportation path. The imaging device may also be a traffic camera, such as a traffic camera that is mounted on a traffic light along the transportation path. Further, the imaging device may be a drone that is flown above the transportation path, or moved along any suitable surface, such as the ground, a wall, or an elevated track that is suspended from a ceiling. For example, multiple drones may be launched from a vehicle in order to image the primary locations where goods carriers may accumulate within a geographical area, such as a city. In addition, the imaging device may be a dashcam in a human-operated vehicle or an autonomous vehicle. Other examples of imaging devices may include laser scanners, sonar, LIDAR, and stereoscopic imagers. Some imaging devices may be used to acquire images through barriers such as walls or ceilings, such as RF imagers, and the images may be transmitted by any suitable method, such as over a WiFi network. In some embodiments, the perspective of the second image file 805 may be corrected, and/or the second image file 805 may be rotated, cropped, aligned and/or scaled.

At process block 810, goods carriers from third parties that are not associated with the particular source may be filtered out of the second image, such that goods carriers from third parties are not included in the count of the number of goods carriers. The filtering may be performed by a machine learning system, such as an artificial neural network. The goods carriers from third parties may be identified based on various identifying features, such as the size, shape, and/or color of the goods carriers. The goods carriers from third parties may also be identified by markings, such as letters, numbers, and/or symbols on the goods carriers. At process block 815, the machine learning system may match at least a subset of the remaining goods carriers to the first type of goods carriers from the particular source. The matching may be performed by the machine learning system. For example, the first type of goods carriers may be wooden pallets, plastic pallets, display pallets, automotive pallets, or aviation pallets. The first type of goods carriers may be identified based on various identifying features, such as the size, shape, and/or color of the goods carriers. The first type of goods carriers may also be identified by markings, such as letters, numbers, and/or symbols on the goods carriers.

At process block 820, a second number of goods carriers of the first type in the second image may be determined. The determination may be made by the machine learning system. For example, the machine learning system may be trained by inputting a plurality of training image files that include a respective plurality of training images, along with a known number of goods carriers of the first type that are depicted in each training image. After this training, the machine learning system can count the number of goods carriers of the first type in the second image file 805.

The methods described above may be used to track the location of goods carriers from the particular source. For example, by counting the number of goods carriers of the first type in the second image at process block 820, it may be determined that a particular set or shipment of goods carriers of the first type is present at the location where the second image file 805 was acquired at the time that the second image file 805 was acquired. For this purpose, the second image file 805 may include second data indicating a second time and a second location at which the second image was acquired. It may also be determined whether all of the goods carriers in the initial shipment are still together, or whether some of the goods carriers have become separated from the initial shipment.

Figure 9:
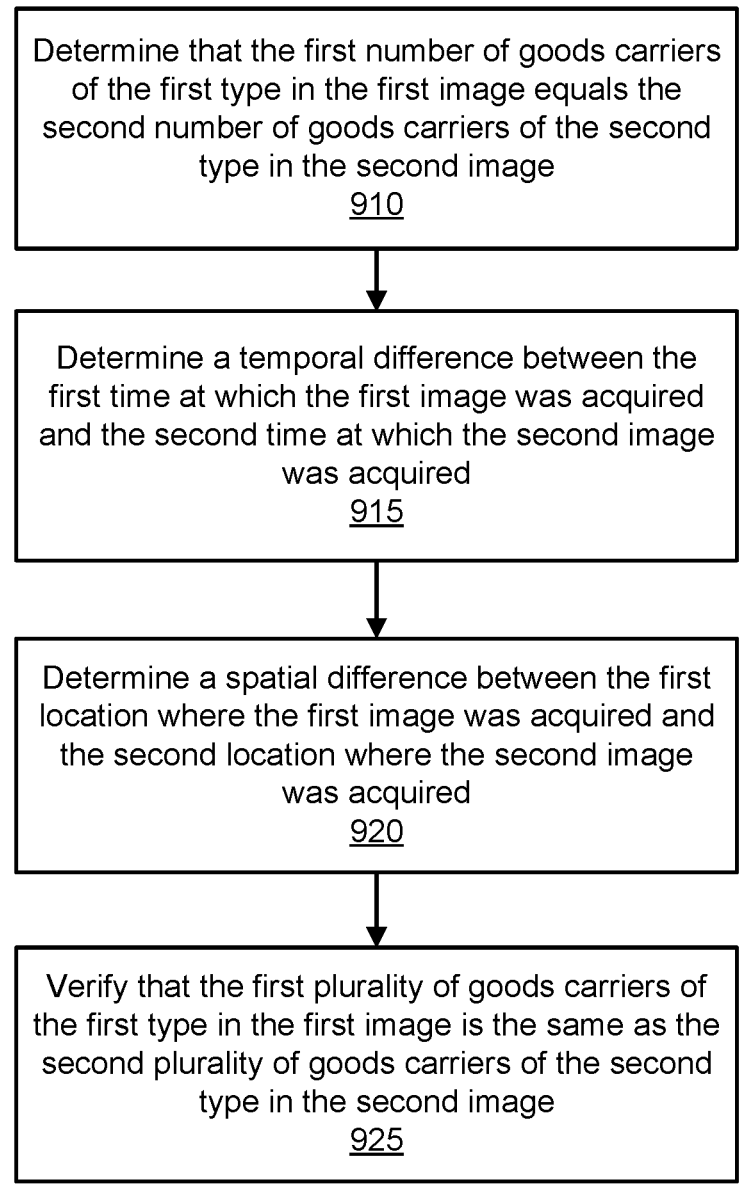
FIG. 9 is a flow chart illustrating another method for pallet tracking, in accordance with some embodiments.

FIG. 9 is a flow chart illustrating another exemplary method for goods carrier tracking, in accordance with some embodiments. As shown in FIG. 9, the results of the analysis of the first image file 705 and the second image file 805 may be used in conjunction to track the goods carriers as they move along the transportation path. At processing block 910, it may be determined whether the first number of goods carriers of the first type in the first image equals the second number of goods carriers of the first type in the second image. If the result of this determination is positive, a temporal difference between the first time at which the first image was acquired and the second time at which the second image was acquired may be determined at processing block 915. Similarly, a spatial difference between the first location at which the first image was acquired and the second location at which the second image was acquired may be determined at processing block 920. In addition, it may be verified that the goods carriers of the first type in the first image are the same as the goods carriers of the first type in the second image by using the machine learning system to identify another object within both the first image and the second image at processing block 925. This object is presumed to travel along the transportation path with the goods carriers.

In other embodiments, the methods described above may be used in conjunction with the beacon 150 that is arranged on the goods carrier 100. For example, the beacon 150 may provide information regarding the identity of the goods carrier 100, which can confirm that the goods carrier 100 matches the first type of goods carriers. Further, the beacon 150 may indicate the current location of the goods carrier 100.

The methods described above may also be used to evaluate inferences and/or predictions regarding the number of goods carriers of a particular type that are expected to appear in an image acquired at a specific time and/or location. For example, if a store is closed for several days, it would not be expected to see goods carriers in an image acquired at the store. On the other hand, if a shipment of fifteen goods carriers is scheduled to arrive at a warehouse on a particular day, or if the warehouse always receives a shipment of fifteen goods carriers in the morning, it would be expected to see fifteen goods carriers in an image acquired at the warehouse. The methods described above may be used to determine whether such predictions of the flow of goods carriers through the transportation path are accurate.

In addition, machine learning techniques may be used to build models regarding where goods carriers are expected to accumulate within the transportation path. For example, historical data may be analyzed to predict that four goods carriers are expected to accumulate at a first node within the transportation path on a particular date. This prediction may allow a provider to send a vehicle that is big enough to accommodate the four goods carriers to the first node. Further, even if an imaging device records images of four goods carriers at a second node within the transportation path, machine learning techniques may be used to infer that there are actually sixteen goods carriers at the second node. This may allow the provider to send a vehicle that is big enough to accommodate the sixteen goods carriers to the second node.

Further, knowledge of how the goods carriers are flowing through the transportation path may be used to resolve ambiguities in an image. For example, if a stack of twenty goods carriers is known or predicted to be present on a loading dock, this information can help the machine learning system determine how many goods carriers are in a stack in an image of the loading dock, even if some of the goods carriers are obscured by other goods carriers or by other objects within the image. Information regarding the location of a goods carrier may be obtained from the beacon 150 located on the goods carrier.

In addition, various image processing techniques may be used in conjunction with the methods described above. For example, a specific stack of goods carriers may be isolated from an image that includes a plurality of stacks of goods carriers. This may be accomplished by any suitable method, such as applying a foreground/background segmentation to the image. Further, images including goods carriers may be combined with location data to generate a 3-dimensional image or model of a stack of goods carriers for use in counting the number of goods carriers in the stack. Also, 3-dimensional imaging devices may be used to incorporate depth information while identifying and/or counting goods carriers within a stack.

Further, three-dimensional information may be extrapolated from a series of two-dimensional images, such as images acquired by a drone. Various machine learning techniques, such as deep learning algorithms or diffusion methods, may be used to fill in the gaps between the two-dimensional images. Alternatively, three-dimensional information may be obtained with LIDAR or stereoscopic imaging. The three-dimensional information, along with knowledge regarding the physical characteristics of a goods carrier from a particular source, may be used as input to train a machine learning algorithm to analyze two-dimensional images. An object with known physical characteristics, such as the goods carrier from the particular source, may be used to correct the perspective of the image and/or estimate the depth level of a stack of goods carriers, even if some of the goods carriers are obscured by other objects in the image.

Various advantages may be observed by implementing disclosed embodiments of the invention. For example, embodiments of the invention may be implemented with low cost hardware resources to capture images and low cost or free software resources to process the images. In another example, embodiments of the invention may be efficient in that they do not require modification of existing goods carrier manufacturing processes or physical manipulation of the goods carrier structure. In yet another example, embodiments of the invention may be robust in that they can track goods carriers in situations that could cause a physical label on a goods carrier to be lost. In still another example, embodiments of the invention may use a mobile phone camera to enable goods carrier counting and tracking in any setting.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined encoder-decoder (CODEC).

What is claimed is:

1. A method for tracking goods carriers from a particular source, the method comprising:
 receiving a plurality of training image files, wherein each of the plurality of training image files comprises a respective training image that depicts a respective plurality of goods carriers from the particular source;
 for each of the plurality of training image files:
  using an artificial neural network to determine an estimated number of the respective plurality of goods carriers from the particular source in the respective training image; and
  determining a comparison of the estimated number of the respective plurality of goods carriers from the particular source in the respective training image with a known number of the respective plurality of goods carriers from the particular source in the respective training image;
 using the comparisons to train the artificial neural network by adjusting weights associated with artificial neurons within the artificial neural network;
 receiving a first image file generated by a first imaging device, wherein the first image file comprises a first image that depicts a first plurality of goods carriers from the particular source, and the first image is associated with a transportation path having a plurality of nodes;
 using the trained artificial neural network to determine a first number of goods carriers from the particular source in the first image;
 receiving a second image file generated by a second imaging device, wherein the second image file comprises a second image that depicts a second plurality of goods carriers from the particular source, and the second image is associated with the transportation path;
 using the trained artificial neural network to determine a second number of goods carriers from the particular source in the second image; and
 determining whether the first number of goods carriers from the particular source in the first image is equal to the second number of goods carriers from the particular source in the second image.

2. The method of claim 1, wherein the first imaging device is a security camera, a traffic camera, a drone, a mobile device, a laser scanner, a sonar device, a LIDAR device, a stereoscopic imager, or an RF imager.

3. The method of claim 1, further comprising:
 filtering out goods carriers from third parties not associated with the particular source from the first image; and
 filtering out goods carriers from third parties not associated with the particular source from the second image.

4. The method of claim 1, wherein:
 the first image file further comprises first data indicating a first time and a first location at which the first image was acquired, and
 the second image file further comprises second data indicating a second time and a second location at which the second image was acquired.

5. The method of claim 4, further comprising:
 determining that the first number of goods carriers from the particular source is equal to the second number of goods carriers from the particular source; and
 determining a temporal difference between the first time and the second time.

6. The method of claim 5, further comprising determining a spatial difference between the first location and the second location.

7. The method of claim 1, further comprising:
 determining that the first number of goods carriers from the particular source in the first image is equal to the second number of goods carriers from the particular source in the second image; and
 verifying that the first plurality of goods carriers from the particular source in the first image is the same as the second plurality of goods carriers from the particular source in the first image by using the artificial neural network to identify an object within both the first image and the second image.

8. The method of claim 1, further comprising:
 matching at least a subset of the first plurality of goods carriers from the particular source in the first image to a first type of goods carriers from the particular source; and
 matching at least a subset of the second plurality of goods carriers from the particular source in the second image to the first type of goods carriers from the particular source.

9. The method of claim 1, further comprising processing the first image with the artificial neural network to correct a perspective of the first image.

10. The method of claim 1, wherein at least one goods carrier of the first plurality of goods carriers from the particular source is obscured within the first image.

11. A computer-program product for tracking goods carriers from a particular source, the computer-program product tangibly embodied in a non-transitory machine-readable storage medium of a device, including instructions that, when executed by one or more processors, cause the one or more processors to:
 receive a plurality of training image files, wherein each of the plurality of training image files comprises a respective training image that depicts a respective plurality of goods carriers from the particular source;
 for each of the plurality of training image files:
  use an artificial neural network to determine an estimated number of the respective plurality of goods carriers from the particular source in the respective training image; and
  determine a comparison of the estimated number of the respective plurality of goods carriers from the particular source in the respective training image with a known number of the respective plurality of goods carriers from the particular source in the respective training image;
 use the comparisons to train the artificial neural network by adjusting weights associated with artificial neurons within the artificial neural network;
 receive a first image file generated by a first imaging device, wherein the first image file comprises a first image that depicts a first plurality of goods carriers from the particular source, and the first image is associated with a transportation path having a plurality of nodes;

use the trained artificial neural network to determine a first number of goods carriers from the particular source in the first image;

receive a second image file generated by a second imaging device, wherein the second image file comprises a second image that depicts a second plurality of goods carriers from the particular source, and the second image is associated with the transportation path;

use the trained artificial neural network to determine a second number of goods carriers from the particular source in the second image; and determine whether the first number of goods carriers from the particular source in the first image is equal to the second number of goods carriers from the particular source in the second image.

12. The computer-program product of claim 11, wherein the first imaging device is a security camera, a traffic camera, a drone, a mobile device, a laser scanner, a sonar device, a LIDAR device, a stereoscopic imager, or an RF imager.

13. The computer-program product of claim 11, wherein the instructions further cause the one or more processors to:
filter out goods carriers from third parties not associated with the particular source from the first image; and
filter out goods carriers from third parties not associated with the particular source from the second image.

14. The computer-program product of claim 11, wherein:
the first image file further comprises first data indicating a first time and a first location at which the first image was acquired, and
the second image file further comprises second data indicating a second time and a second location at which the second image was acquired.

15. The computer-program product of claim 14, wherein the instructions further cause the one or more processors to:
determine that the first number of goods carriers from the particular source is equal to the second number of goods carriers from the particular source; and
determine a temporal difference between the first time and the second time.

16. The computer-program product of claim 15, wherein the instructions further cause the one or more processors to determine a spatial difference between the first location and the second location.

17. The computer-program product of claim 11, wherein the instructions further cause the one or more processors to:
determine that the first number of goods carriers from the particular source in the first image is equal to the second number of goods carriers from the particular source in the second image; and
verify that the first plurality of goods carriers from the particular source in the first image is the same as the second plurality of goods carriers from the particular source in the first image by using the artificial neural network to identify an object within both the first image and the second image.

18. The computer-program product of claim 11, wherein the instructions further cause the one or more processors to:
match at least a subset of the first plurality of goods carriers from the particular source in the first image to a first type of goods carriers from the particular source; and
match at least a subset of the second plurality of goods carriers from the particular source in the second image to the first type of goods carriers from the particular source.

19. The computer-program product of claim 11, wherein the instructions further cause the one or more processors to process the first image with the artificial neural network to correct a perspective of the first image.

20. The computer-program product of claim 11, wherein at least one goods carrier of the first plurality of goods carriers from the particular source is obscured within the first image.

21. A device for tracking goods carriers from a particular source, the device comprising:
a processor; and
a memory coupled to the processor, the memory storing instructions that, when executed by the processor, cause the device to perform operations including:
receiving a plurality of training image files, wherein each of the plurality of training image files comprises a respective training image that depicts a respective plurality of goods carriers from the particular source;
for each of the plurality of training image files:
using an artificial neural network to determine an estimated number of the respective plurality of goods carriers from the particular source in the respective training image; and
determining a comparison of the estimated number of the respective plurality of goods carriers from the particular source in the respective training image with a known number of the respective plurality of goods carriers from the particular source in the respective training image;
using the comparisons to train the artificial neural network by adjusting weights associated with artificial neurons within the artificial neural network;
receiving a first image file generated by a first imaging device, wherein the first image file comprises a first image that depicts a first plurality of goods carriers from the particular source, and the first image is associated with a transportation path having a plurality of nodes;
using the trained artificial neural network to determine a first number of goods carriers from the particular source in the first image;
receiving a second image file generated by a second imaging device, wherein the second image file comprises a second image that depicts a second plurality of goods carriers from the particular source, and the second image is associated with the transportation path;
using the trained artificial neural network to determine a second number of goods carriers from the particular source in the second image; and
determining whether the first number of goods carriers from the particular source in the first image is equal to the second number of goods carriers from the particular source in the second image.

22. The device of claim 21, wherein the first imaging device is a security camera, a traffic camera, a drone, a mobile device, a laser scanner, a sonar device, a LIDAR device, a stereoscopic imager, or an RF imager.

23. The device of claim 21, wherein the operations further include:
filtering out goods carriers from third parties not associated with the particular source from the first image; and filtering out goods carriers from third parties not associated with the particular source from the second image.

24. The device of claim 21, wherein:
the first image file further comprises first data indicating a first time and a first location at which the first image was acquired, and
the second image file further comprises second data indicating a second time and a second location at which the second image was acquired.

25. The device of claim 24, wherein the operations further include:
determining that the first number of goods carriers from the particular source is equal to the second number of goods carriers from the particular source; and
determining a temporal difference between the first time and the second time.

26. The device of claim 25, wherein the operations further include determining a spatial difference between the first location and the second location.

27. The device of claim 21, wherein the operations further include:
determining that the first number of goods carriers from the particular source in the first image is equal to the second number of goods carriers from the particular source in the second image; and verifying that the first plurality of goods carriers from the particular source in the first image is the same as the second plurality of goods carriers from the particular source in the first image by using the artificial neural network to identify an object within both the first image and the second image.

28. The device of claim 21, wherein the operations further include:
matching at least a subset of the first plurality of goods carriers from the particular source in the first image to a first type of goods carriers from the particular source; and
matching at least a subset of the second plurality of goods carriers from the particular source in the second image to the first type of goods carriers from the particular source.

29. The device of claim 21, wherein the operations further include processing the first image with the artificial neural network to correct a perspective of the first image.

30. The device of claim 21, wherein at least one goods carrier of the first plurality of goods carriers from the particular source is obscured within the first image.

* * * * *